(12) United States Patent
Purusothaman et al.

(10) Patent No.: US 10,116,509 B2
(45) Date of Patent: Oct. 30, 2018

(54) SYSTEM AND METHOD FOR MONITORING AND MANAGING OBJECTS ACROSS DATA CENTERS

(71) Applicant: Payoda Inc., Plano, TX (US)

(72) Inventors: Anand Purusothaman, Jersey, NJ (US); Murali Palanisamy, Jersey, NJ (US)

( * ) Notice: Subject to any disclaimer, the term of this patent is extended or adjusted under 35 U.S.C. 154(b) by 422 days.

(21) Appl. No.: 14/808,219

(22) Filed: Jul. 24, 2015

(65) Prior Publication Data
US 2017/0026240 A1  Jan. 26, 2017

(51) Int. Cl.
*H04L 12/24* (2006.01)
*G06F 3/0482* (2013.01)
*G06F 3/0484* (2013.01)
*G06F 3/0481* (2013.01)
*G06F 11/30* (2006.01)
*G06F 11/32* (2006.01)

(52) U.S. Cl.
CPC ........ *H04L 41/0853* (2013.01); *G06F 3/0481* (2013.01); *G06F 3/0482* (2013.01); *G06F 3/0484* (2013.01); *G06F 11/3006* (2013.01); *G06F 11/3051* (2013.01); *H04L 41/0233* (2013.01); *H04L 41/0856* (2013.01); *H04L 41/0859* (2013.01); *G06F 11/3055* (2013.01); *G06F 11/328* (2013.01); *H04L 41/22* (2013.01)

(58) Field of Classification Search
CPC .............. G06F 3/0481; G06F 11/3006; H04L 41/0859; H04L 41/0856
See application file for complete search history.

(56) References Cited

U.S. PATENT DOCUMENTS

| | | | | |
|---|---|---|---|---|
| 8,285,302 B1* | 10/2012 | Espy | ....................... | H04L 67/18 340/539.13 |
| 9,100,190 B1* | 8/2015 | Schwengler | .......... | H04L 9/3263 |
| 9,495,062 B1* | 11/2016 | Reiner | .................. | G06F 3/0481 |
| 2004/0189693 A1* | 9/2004 | Kenig | ................... | G06F 11/323 715/736 |
| 2010/0185596 A1* | 7/2010 | Dee | ................... | G06F 17/30289 707/695 |
| 2011/0022882 A1* | 1/2011 | Jaehde | ................ | G06F 11/2023 714/4.1 |
| 2012/0066371 A1* | 3/2012 | Patel | ................... | H04L 67/1031 709/224 |
| 2013/0232240 A1* | 9/2013 | Purusothaman | ...... | H04L 43/045 709/220 |

* cited by examiner

*Primary Examiner* — Aaron Lowenberger
(74) *Attorney, Agent, or Firm* — The Law Office of Austin Bonderer, PC; Austin Bonderer

(57) ABSTRACT

A computer implemented method for monitoring and managing one or more objects on granular object level across datacenters is provided. The method includes following steps: (i) creating an application id; (ii) searching the one or more objects across the datacenters; (iii) adding the one or more objects to the application ID; (iv) monitoring configurations of the one or more objects; (iv) providing a graphical depiction of logs of the one or more objects; (v) providing an option to check a work order and configuration changes of the one or more objects; (vi) providing a graphical depiction of the configuration changes occurred on the one or more objects over a period of time; (vii) providing a trend graph for the one or more objects; and (viii) creating a new rule for the application ID to monitor and manage the one or more objects on granular object level.

15 Claims, 44 Drawing Sheets

| AppViewID | Certificate | DNS | Firewall | ADC | Servers | Switches | Routers |
|---|---|---|---|---|---|---|---|
| #insurance | 67 | 3 | 452 | 3 | 205 | 6 | 8 |
| #mobileapp | 10 | 3 | 3 | 50 | 300 | 140 | 220 |
| #lending | 12 | 5 | 5 | 20 | 1000 | 66 | 110 |
| #forexchange | 7 | 8 | 8 | 40 | 200 | 58 | 20 |
| #locatemap | 9 | 10 | 10 | 2 | 20 | 32 | 36 |
| #personalac | 8 | 12 | 12 | 70 | 10 | 44 | 78 |
| #corporateac | 1 | 7 | 7 | 80 | 400 | 22 | 88 |
| #corporatelending | 2 | 2 | 2 | 100 | 200 | 26 | 92 |
| #corporatebiz | 4 | 4 | 4 | 110 | 150 | 88 | 48 |
| #bizcorp | 22 | 6 | 6 | 120 | 128 | 90 | 66 |
| #bizlending | 18 | 6 | 6 | 125 | 90 | 92 | 64 |
| #smelending | 17 | 2 | 2 | 130 | 100 | 94 | 22 |
| #smecorplending | 15 | 2 | 2 | 66 | 105 | 96 | 21 |
| #inssmes | 128 | 2 | 2 | 30 | 110 | 88 | 20 |
| #insuranceapps | 2 | 2 | 2 | 15 | 124 | 92 | 20 |

SYSTEM AND METHOD FOR MONITORING AND MANAGING OBJECTS ACROSS DATA CENTERS

BACKGROUND

Technical Field

The embodiments herein generally relates to an application management system, and more particularly, to a system and method for monitoring and managing one or more objects and individual networking components on a consolidated platform across data centers.

Description of the Related Art

Delivery of application and management of objects in network is critical for application owners and network administrators. Existing tools are not supported by development teams, as there are multiple different tools with each of them running on an independent script. Collaboration among the tools is essential for the efficient functioning of the system. Existing applications are independent of each other with an access restricted to concerned independent teams. Thus, an unreasonable amount of time and resources are spent on writing scripts every time a team needs to monitor objects outside the scope of access. Also, there is no single-view visibility of an application across networking components running on multiple data centers to manage objects.

Device/object level operations on management tools make routing traffic among data centers difficult and unnecessarily complex. This amplifies the risk of errors and difficulties in setting up and altering rules to serve traffic. Monitoring of applications/objects, studying statistics, managing certificates and gauging the health of applications are highly complex in existing systems. An increased number of independent tools render migration/upgrading of network tools almost impossible. Also, fixing issues consumes time, which is very critical in industries like banking, healthcare, and the like where data management is critical.

The most common solution for application delivery and object management are provided by device vendors themselves. However, these solutions monitor the objects and give a device-centric view of the network, which does not meet the requirements of application owners, and network administrators to monitor network components.

Accordingly, there is a need for a system to monitor and manage one or more objects (e.g., a rule of firewall device, a certificate, a domain name system (DNS) record, objects of application delivery controller (ADC) device, a firewall device, an ADC device, and a server) across data centers.

SUMMARY

In view of the foregoing, an embodiment herein provides an application management system for monitoring and managing one or more objects on granular object level in one or more datacenters. The application management system includes a memory unit, and a processor. The memory unit stores a database and a set of modules. The processor executes the set of modules. The set of modules includes a tag module, an option module, an add module, and a manage module. The tag module, executed by the processor, is configured to create an application ID with description. The option module, executed by the processor, is configured to provide an option to search the one or more objects across the one or more datacenters. The add module, executed by the processor, is configured to add the one or more objects to the application ID. The manage module, executed by the processor, is configured to manage the one or more objects that are added to the application ID on granular object level. The manage module includes a configuration module, a log module, an audit module, a configuration drift module, and an application analytics module. The configuration module, executed by the processor, is configured to monitor configurations of the one or more objects. The log module, executed by the processor, is configured to provide a graphical depiction of logs of the one or more objects. The audit module, executed by the processor, is configured to check a work order and configuration changes of the one or more objects. The configuration drift module, executed by the processor, is configured to provide a graphical depiction of the configuration changes occurred on the one or more objects over a period of time. The application analytics module, executed by the processor, is configured to provide a trend graph for the one or more objects.

In one embodiment, the one or more objects includes at least one of (i) an Application delivery controller (ADC) device, (ii) an object of the ADC device, (iii) a firewall device, (iv) a rule/policy of the firewall device, (v) a certificate, (vi) a domain name system (DNS) record, (vii) a network router, (viii) a network switch, and (ix) a server. In another embodiment, the one or more objects include at least one of (i) an ADC device, and (ii) a firewall device. In yet another embodiment, the set of modules includes a group module, an un-group module, and an un-tag module. The group module, executed by the processor, is configured to group the one or more objects to the application ID. The un-group module, executed by the processor, is configured to un-group the one or more objects from the application ID. The un-tag module, executed by the processor, is configured to remove the one or more objects from the application ID. In yet another embodiment, the set of modules further includes an application ID search module, and a refresh module. The application ID search module, executed by the processor, is configured to search an existing application ID across the one or more datacenters based on a keyword. The refresh module, executed by the processor, is configured to restore a previous setting in the application ID. In yet another embodiment, the manage module includes a restore module, a status module, an alert module, a note module, and a chat module. The restore module, executed by the processor, is configured to restore previous configurations of the one or more object. The status module, executed by the processor, is configured to provide a status of the one or more objects. The alert module, executed by the processor, is configured to provide an alert associated with specification details of the one or more objects. The note module, executed by the processor, is configured to add a note to the one or more objects. The chat module, executed by the processor, is configured to provide an option to chat with (i) an administrator, or (ii) one or more users regarding the one or more objects. In yet another embodiment, the manage module includes a rule module, executed by the processor, is configured to (a) create a new rule for the application ID to monitor and manage the one or more objects on granular object level, and (b) automatic create a work order ID for the new rule to proceed with a task as mentioned in the new rule. In yet another embodiment, the manage module includes an ADC managing module, a certificate managing module, a firewall managing module, a DNS managing module, and a server managing module. The ADC managing module, executed by the processor, is configured to manage (a) an ADC device, and (b) objects of the ADC device. The certificate managing module, executed by the processor, is configured to manage a certificate. The firewall managing module, executed by the processor, is configured to manage (a) a firewall device, and (b) rules/policies of the firewall device. The DNS managing module, executed by the processor, is configured to manage (a) a DNS device, and (b) DNS records. The server managing module, executed by the processor, is configured to manage a server. In yet another embodiment, the ADC managing module includes an ADC configuration module, a secure shell (SSH) module, a physical layout module, and an ADC tagging module. The ADC configuration module, executed by the processor, is configured to provide configuration details of the ADC device. The secure shell (SSH) module, executed by the processor, is configured to provide a SSH connectivity details of the ADC device. The physical layout module, executed by the processor, is configured to provide a physical layout of the ADC device. The ADC tagging module, executed by is processor, is configured to provide tag details of the ADC device with existing application ID's. In yet another embodiment, the certificate managing module provides a holistic view of a selected certificate with appropriate chain structure. In yet another embodiment, the server managing module automatically creates a new server to manage a traffic overload between a server and the one or more objects. The server managing module provides a host information specific to the DNS device when a server is selected.

In another aspect, a computer implemented method for monitoring and managing one or more objects on granular object level across one or more datacenters is provided. The method includes following steps: (i) creating an application id; (ii) searching the one or more objects across the one or more datacenters; (iii) adding the one or more objects to the application ID; (iv) monitoring configurations of the one or more objects; (iv) providing a graphical depiction of logs of the one or more objects; (v) providing an option to check a work order and configuration changes of the one or more objects; (vi) providing a graphical depiction of the configuration changes occurred on the one or more objects over a period of time; (vii) providing a trend graph for the one or more objects; and (viii) creating a new rule for the application ID to monitor and manage the one or more objects on granular object level.

In one embodiment, the computer implemented method further includes following steps (i) providing a status of the one or more objects; (ii) providing an alert associated with specification details of the one or more objects; (iii) providing an option to add a note to the one or more objects; and (iv) providing an option to chat with (i) an administrator, or (ii) one or more user regarding the one or more objects. In another embodiment, the computer implemented method further includes following steps (i) searching an existing application ID based on a keyword; (ii) restoring a previous settings in the application ID; (iii) grouping the one or more objects with the application ID; (iv) un-grouping the one or more objects from the application ID; and (v) un-tagging a group from the application ID. In yet another embodiment, the one or more objects includes at least one of (i) an Application delivery controller (ADC) device, (ii) an object of the ADC device, (iii) a firewall device, (iv) a rule/policy of the firewall device, (v) a certificate, (vi) a domain name system (DNS) record, (vii) a network router, (viii) a network switch, and (ix) a server. In yet another embodiment, the computer implemented method further includes following steps (i) providing configuration details of the ADC device; (ii) providing a SSH connectivity details of the ADC device; (iii) providing a physical layout of the ADC device; and (iv) providing tag details of the ADC device with existing application ID's.

In yet another aspects, a non-transitory program storage device readable by computer, and includes a program of instructions executable by the computer to perform a method for monitoring and managing one or more objects on granular object level across one or more datacenters is provided. The method includes following steps: (i) creating an application ID; (ii) searching the one or more objects across the one or more datacenters; (iii) adding the one or more objects to the application ID; (iv) monitoring configurations of the one or more objects; (v) providing a graphical depiction of logs of the one or more objects; (vi) providing an option to check a work order and configuration changes of the one or more objects; (vii) providing a graphical depiction of the configuration changes occurred on the one or more objects over a period of time; (viii) provide a trend graph for the one or more objects; (ix) providing a status of the one or more objects; (x) providing an alert associated with specification details of the one or more objects; (xi) providing an option to add a note to the one or more objects; (xii) providing an option to chat with (a) an administrator, or (b) one or more user regarding the one or more objects; and (xiii) creating a new rule for the application ID to monitor and manage the one or more objects on granular object level.

In one embodiment, the method further includes following steps: (i) searching an existing application ID based on a keyword; (ii) restoring a previous settings in the application ID; (iii) grouping the one or more objects with the application ID; (iii) un-grouping the one or more objects from the application ID; and (iv) un-tagging a group from the application ID. In another embodiment, the one or more objects includes at least one of (i) an Application delivery controller (ADC) device, (ii) an object of the ADC device, (iii) a firewall device, (iv) a rule/policy of the firewall device, (v) a certificate, (vi) a domain name system (DNS) record, (vii) a network router, (viii) a network switch, and (ix) a server. In yet another embodiment, the method further includes following steps: (i) providing configuration details of the ADC device; (ii) providing a SSH connectivity details of the ADC device; (iii) providing a physical layout of the ADC device; and (iv) providing tag details of the ADC device with existing application ID's.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which:

FIG. 3 illustrates a user interface view of the application management system of FIG. 1 according to an embodiment herein;

FIG. 22 illustrates a user interface view of an alert module of the application management system of FIG. 1 according to an embodiment herein;

FIG. 23 illustrates a user interface view of an audit module of the application management system of FIG. 1 according to an embodiment herein;

DETAILED DESCRIPTION OF PREFERRED EMBODIMENTS

Figure 1:
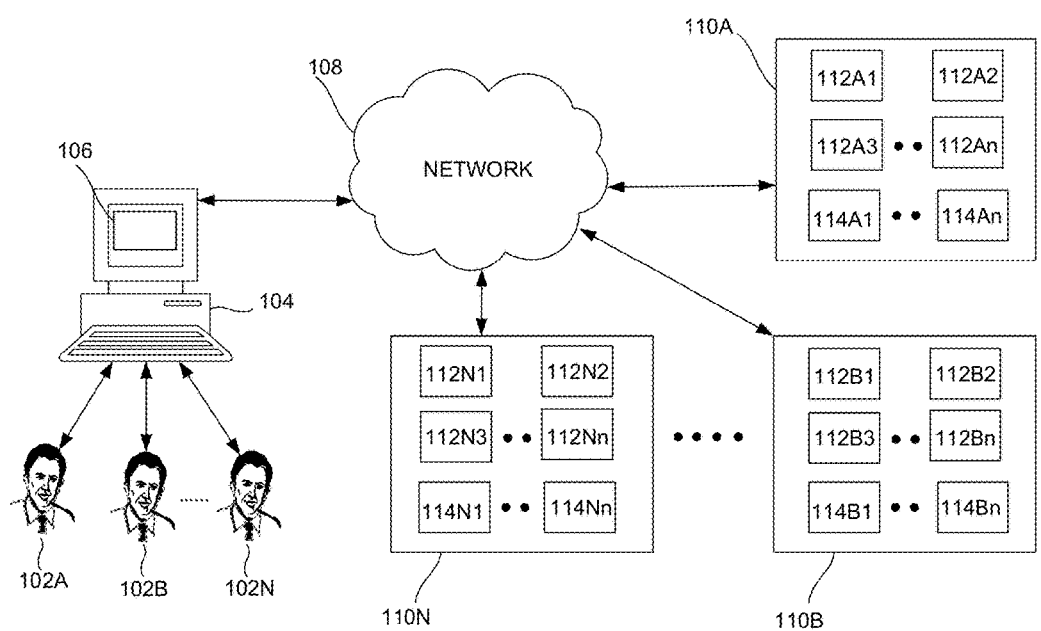
FIG. 1 illustrates a system view of one or more user's communicating with a user system for monitoring and managing one or more objects operating in one or more data centers on granular object level using an application management system according to an embodiment herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Various embodiments of the methods and systems disclosed herein provide an application management system that monitors and manages one or more objects (e.g. a rule of firewall device, a certificate, a domain name system (DNS) record, objects of an application delivery controller (ADC) device, a firewall device, an ADC device, a network router, a network switch, and servers, etc.) by tagging the one or more objects to an application ID. The application management system provides an end-to-end visibility of the one or more objects managed within an application ID (e.g. AppView ID), by providing an option to a user to (a) view the current appropriate status of the one or more objects that are managed, (b) compare the configurations of the one or more objects over a period of time, and provides an option the user to restore to a pervious configuration of the one or more objects, (c) view a list of work order changes occurred for the one or more objects, and (d) generate a trend line graph for one or more objects that depicts the outages and changes occurred on the one or more objects over a period of time. Referring now to the drawings, and more particularly to FIGS. 1 through 29, where similar reference characters denote corresponding features consistently throughout the figures, there are shown preferred embodiments.

FIG. 1 illustrates a system view 100 of one or more user's 102A-N communicating with a user system 104 for monitoring and managing one or more objects 112A1-Nn operating in one or more data centers 110A-N on granular object level using an application management system 106 according to an embodiment herein. The application management system 106 provides a user interface to the one or more users 102A-N to monitor and manage the one or more objects 112A1-Nn across the one or more data centers 110A-N on granular object level. The application management system 106 monitors and manages the one or more objects 112A1-Nn on granular object level by grouping and tagging the one or more objects 112A1-Nn to an application ID (e.g., an AppView ID). The granular object level may include object attributes for authorized functions, and/or access control for properties of the one or more objects 112A1-Nn. In one embodiment, the one or more objects 112A1-Nn includes a certificate, a domain name systems (DNS), records of the domain name systems (DNS), a firewall device (FW), a rule/policy of the firewall device, an application delivery controller (ADC), an object of the application delivery controller (ADC), and a server. In another embodiment, the one or more objects 112A1-Nn includes a network router, and a network switch. The application management system 106 provides an end-to-end visibility of the one or more objects 112A1-Nn managed within the application ID, by providing an option to the one or more users 102A-N to view current status of the one or more objects 112A1-Nn. The application management system 106 further provides an option to the one or more users 102A-N to compare the configurations of the one or more objects 112A1-Nn over a period of time. In one embodiment, the application management system 106 provides an option to the one or more users 102A-N to backup a configuration of the one or more objects 112A1-Nn and provides an option to the one or more users 102A-N to restore/rollback a configuration of the one or more objects 112A1-Nn at a selected point of time. The application management system 106 further provides an option to the one or more users 102A-N to provide a threshold rule for an event/task that needs to performed on the one or more objects 112A1-Nn. The threshold rule automatically triggers a work order for the occurrence of the event/task specified on the one or more objects 112A1-Nn. The application management system 106 provides an option to the one or more users 102A-N to chat with other users 102A-N who manage the one or more objects 112A1-Nn on granular object level. In one embodiment, the one or more users 102A-N adds a note to the application ID for future reference. In another embodiment, the one or more objects 112A1-Nn includes a BIG IP device from F5 networks, ACE—Application Control Engine from Cisco, and Net scaler from Citrix and the like. The one or more data centers 110A-N includes one or more internet protocol (IP) servers 114A1-Nn. In one embodiment, the one or more IP servers 114A1-Nn may be called as domain server, or non-domain servers.

Figure 2A:
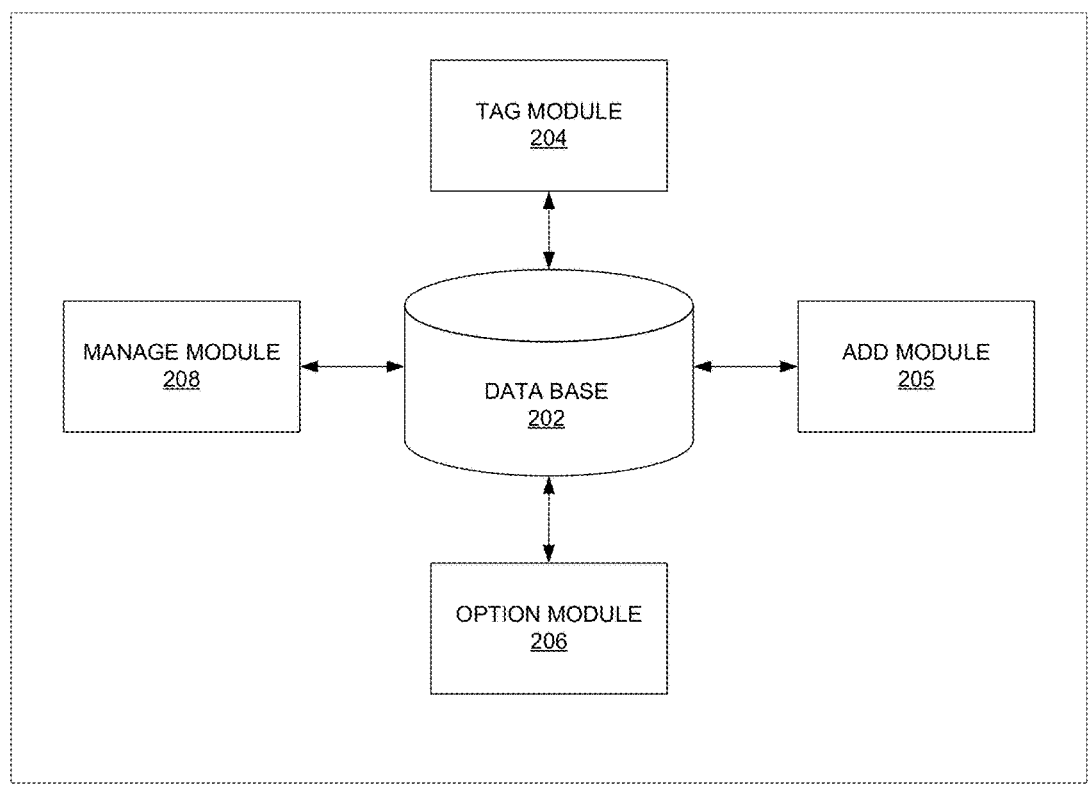
FIG. 2A illustrates an exploded view of the application management system of FIG. 1 according to an embodiment herein.

FIG. 2A illustrates an exploded view of the application management system 106 of FIG. 1 according to an embodiment herein. The application management system 106 includes a database 202, a tag module 204, an add module 205, an option module 206, and a manage module 208. The database 202 includes a certificate details, details of configuration of a device, details of hardware structure of a device, and details of the objects of a device, and the like. The tag module 204 is configured to create a new application ID with description. The add module 205 is configured to add the one or more objects 112A1-Nn to an application ID (e.g., AppView ID). In one embodiment, a name of the application ID is used as a keyword (e.g., a password) by the one or more user's 102A-N to access the one or more objects 112A1-Nn. The option module 206 provides an option to un-tag the one or more objects 112A1-Nn from the application ID. In one embodiment, the application management system 106 provides log details to the one or more user's 102A-N when the one or more objects 112A1-Nn is removed/untagged from the application ID. The option module 206 provides an option to ungroup the one or more objects 112A1-Nn from the application ID. In one embodiment, the option module 206 provides a user interface to the one or more user's 102A-N to ungroup the one or more objects 112A1-Nn from the application ID. The one or more user's 102A-N may ungroup the selected one or more objects 112A1-Nn from the selected application ID by selecting an un-group option. The option module 206 provides an option to group the one or more objects 112A1-Nn to the application ID. In one embodiment, the option module 206 provides a user interface to the one or more user's 102A-N to group the one or more objects 112A1-Nn to the application ID. The one or more user's 102A-N may create a new group for grouping the one or more objects 112A1-Nn by selecting a group option. In another embodiment, the one or more user's 102A-N may group the one or more objects 112A1-Nn with the existing application ID. The option module 206 provides an option to search the one or more objects 112A1-Nn in the one or more data centers 110A-N. In one embodiment, the option module 206 provides a user interface to the one or more user's 102A-N to search for the one or more objects 112A1-Nn that is tagged to the application ID. The one or more user's 102A-N may search for the one or more objects 112A1-Nn by entering keywords in a search tab. The manage module 208 manages the one or more objects 112A1-Nn that are tagged to the application ID on granular object level.

Figure 2B:
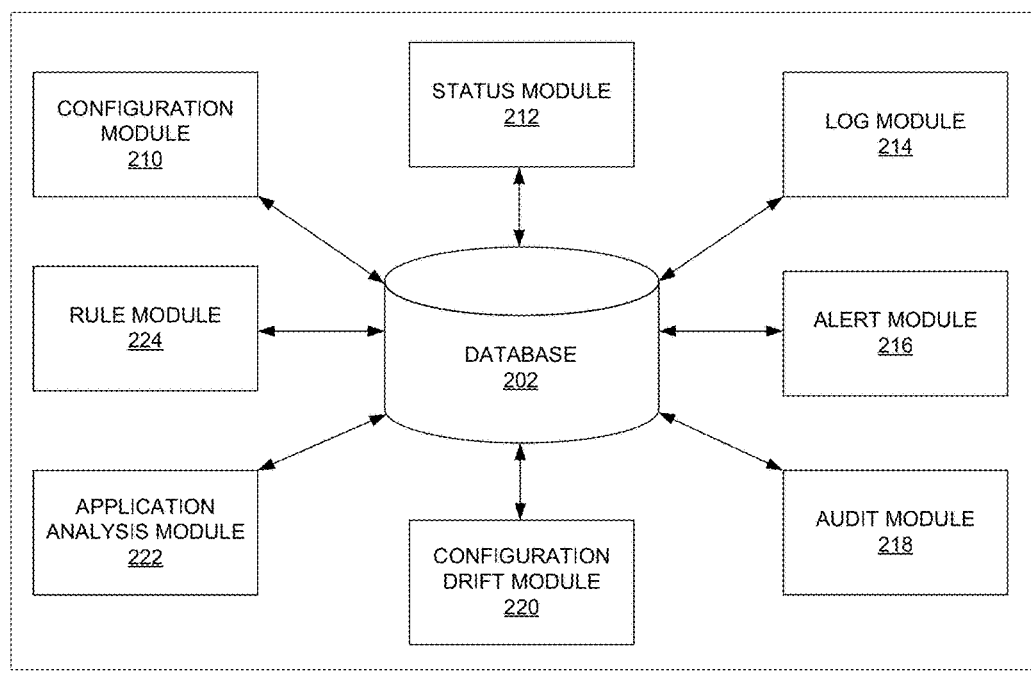
FIG. 2B illustrates an exploded view of the manage module of FIG. 2A according to an embodiment herein.

FIG. 2B illustrates an exploded view of the manage module 208 of FIG. 2A according to an embodiment herein. The manage module 208 includes a configuration module 210, a status module 212, a log module 214, an alert module 216, an audit module 218, a configuration drift module 220, an application analytics module 222, and a rule module 224. The configuration module 210 includes configuration details of the one or more objects 112A1-Nn. The configuration module 210 is configured to monitor the configurations of the one or more objects 112A1-Nn that are tagged to the application ID. The status module 212 is configured to provide a status of a selected object 112 that is tagged to the application ID. In one embodiment, the status module 212 provides a list of the one or more objects 112A1-Nn that is managed within the application ID. When the one or more user's 102A-N selects an object 112 from the list of the one or more objects 112A1-Nn, the status module 212 provides a status of the selected object 112. The log module 214 is configured to provide a graphical depiction of logs of the one or more objects 112A1-Nn based on severity. In one embodiment, the log module 214 is configured to provide logs of the one or more objects 112A1-Nn that are managed within the application ID. In another embodiment, the log module 214 is configured to display specifications of the application ID below the graphical depiction. The alert module 216 is configured to provide an alert regarding the details of specification of the application ID. In one embodiment, the alert module 216 provides the alert (e.g., details of a selected object) when the one or more user's 102A-N selects the object 112 from the list of the one or more objects 112A1-Nn. The audit module 218 is configured to check a work order and configuration changes of the one or more objects 112A1-Nn. The audit module 218 is further configured to provide a work order and configuration changes occurred on the one or more objects 112A1-Nn over a period of time. The configuration drift module 220 is configured to provide a graphical depiction of configuration changes occurred on the one or more objects 112A1-Nn over a period of time. The configuration drift module 220 is configured to provide a summary of the configuration changes occurred on the one or more objects 112A1-Nn when the one or more users 102A-N slides over the graphical depiction. In one embodiment, the one or more objects 112A1-Nn includes a hyperlink to show the comparison view of the configuration changes occurred on the one or more objects 112A1-Nn. The application analytics module 222 is configured to provide a trend graph for the one or more objects 112A1-Nn. The trend graph provides the outages and changes (i.e. frequency of the system logs associated with the one or more objects 112A1-Nn, and/or frequency of configuration changes, status changes associated with the one or more objects 112A1-Nn) occurred on the one or more objects 112A1-Nn that are managed within the application ID. In one embodiment, the trend graph provides the outages based on the device/object category. Outages refers to an impacted status of the application management system 106 when the one or more objects 112A1-Nn is unavailable or into down status. Due to which, the application management system 106 becomes inaccessible to the end user. The rule module 224 is configured to create a new rule for the application ID to monitor and manage the one or more objects 112A1-Nn on granular object level. The rule module 224 provides a list of trigger rules in a grid view. In another embodiment, the rule module 224 is configured to automatic create a work order ID for the new rule to proceed with a task as mentioned in the new rule.

FIG. 3 illustrates a user interface view 300 of the application management system 106 of FIG. 1 according to an embodiment herein. The user interface view 300 provides a search option 302 to the one or more user's 102A-N to search for an existing application ID across the one or more data centers 110A-N. In one embodiment, a name of the application ID is used as a keyword (e.g., password) to search for the application ID. A tag option 304 creates a new application ID to tag and manage the one or more objects 112A1-Nn on granular object level. A grid view option 306 provides a grid view to represent frequently searched devices/objects or currently working devices/objects of the application ID. In one embodiment, the grid view option 306 provides an option to the one or more user's 102A-N to change or delete the device/object from the grid view. The user interface view 300 of the application ID includes details of the application ID as follows: (i) a name of an application ID 308, (ii) a count of the certificates 310 within the application ID, (iii) a count of the domain name systems 312 within the application ID, (iv) a count of the firewall devices 314 within the application ID, (v) a count of the ADC devices 316 within the application ID, (vi) a count of the servers 318 within the application ID, (vii) a count of the switches 320 within the application ID, and (viii) a count of the routers 322 within the application ID.

Figure 4:
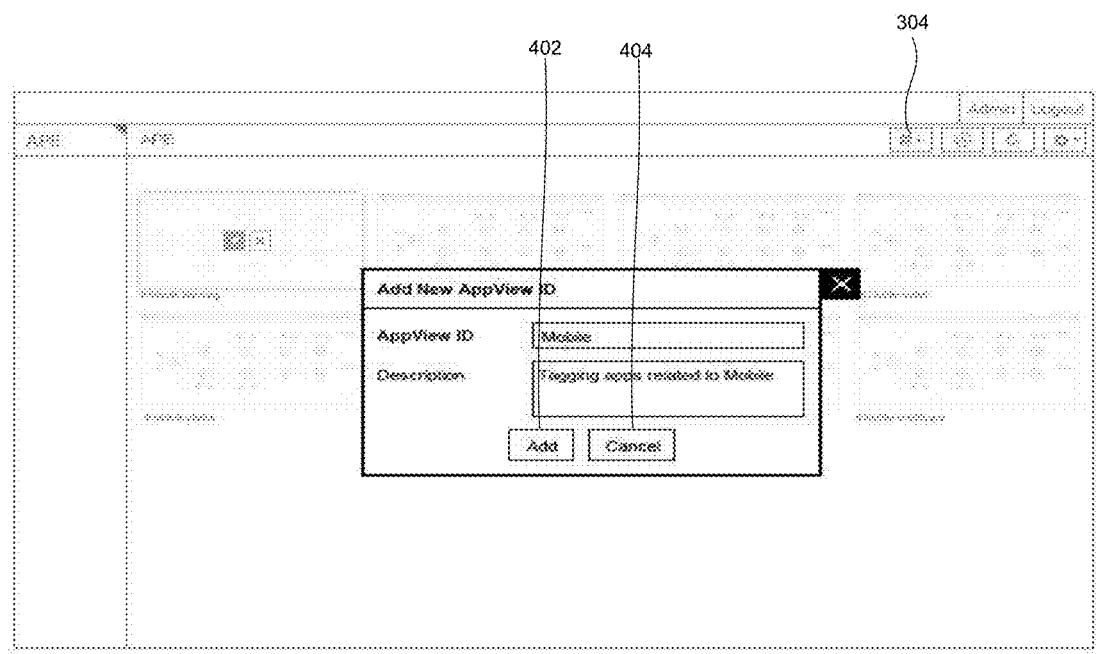
FIG. 4 illustrates a user interface view of the application management system of FIG. 1 for adding an application ID according to an embodiment herein.

FIG. 4 illustrates a user interface view 400 of the application management system 106 of FIG. 1 for adding an application ID according to an embodiment herein. The user interface view 400 provides the tag option 304 to the one or more user's 102A-N to create an application ID with description. The user interface view 400 provides an add option 402 to the one or more user's 102A-N to save/create the application ID. The user interface view 400 is closed when the one or more user's 102A-N selects a cancel option 404.

Figure 5:
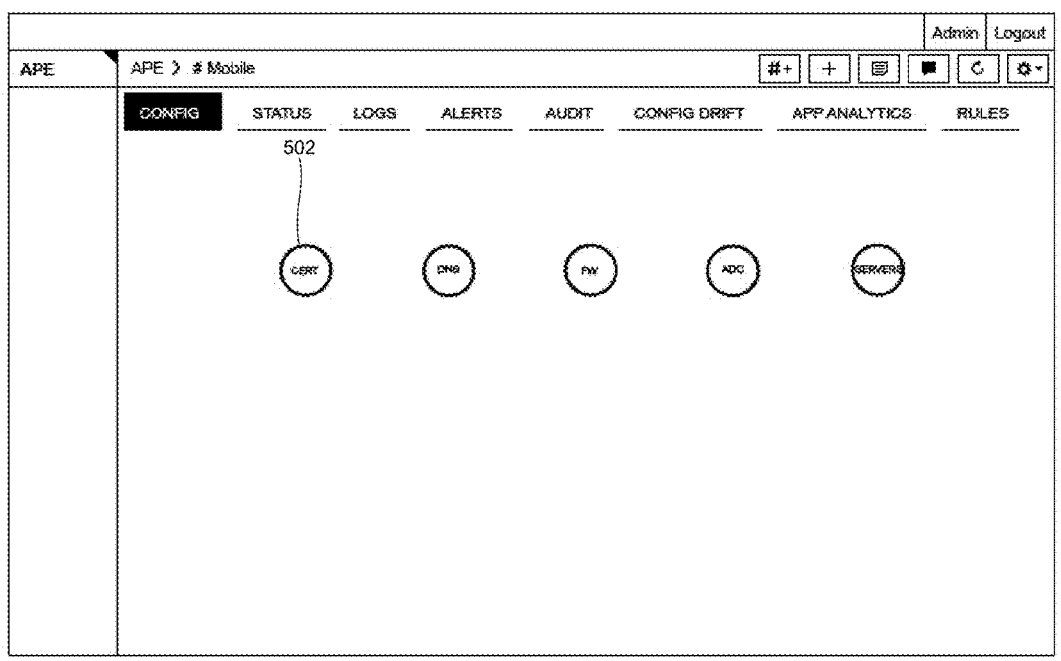
FIG. 5 illustrates a user interface view of the application management system of FIG. 1 for configuring the application ID according to an embodiment herein.

With reference to FIG. 4, FIG. 5 illustrates a user interface view 500 of the application management system 106 of FIG. 1 for configuring the application ID according to an embodiment herein. When the application ID is created, the user interface view 500 displays a default sequence of a graphical representation 502 without a device/object association. The user interface view 500 provides an option to the one or more users 102A-N to search the one or more objects 112A1-Nn in the one or more data centers 110A-N and add a selected device/object to the new application ID.

Figure 6A:
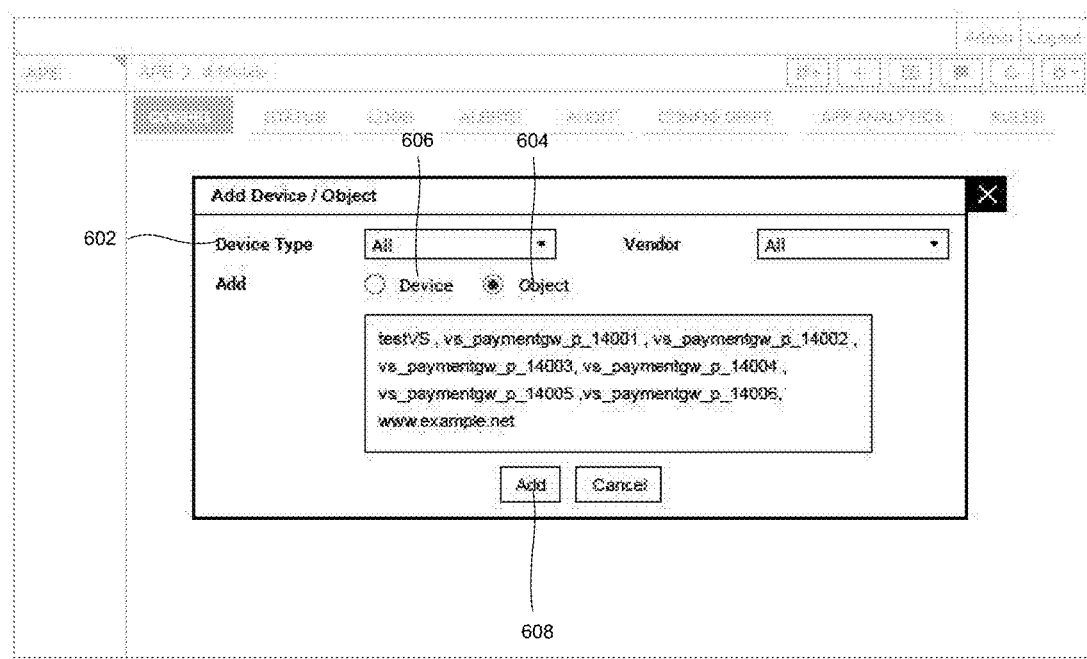
FIGS. 6A and 6B illustrate user interface views of the application management system of FIG. 1 for adding the one or more objects to the application ID according to an embodiment herein.
Figure 6B:
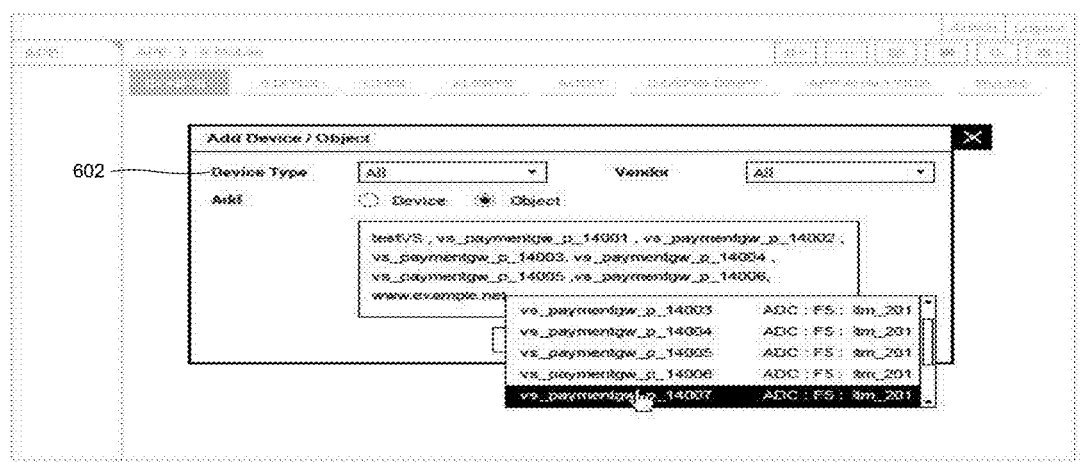

FIGS. 6A and 6B illustrate user interface views of the application management system 106 of FIG. 1 for adding the one or more objects 112A1-Nn to the application ID according to an embodiment herein. The user interface views provides an option to the one or more user's 102A-N to search and add the one or more objects 112A1-Nn to the application ID based on a device type 602. In one embodiment, the user interface views include the device type 602 as follows: (i) an ADC device, (ii) a firewall device, (iii) domain name system (DNS), (iv) a server, (v) a network router, and a network switch. In another embodiment, the user interface views provide an object option 604 to the one or more user's 102A-N to search for the one or more objects 112A1-Nn across the one or more data centers 110A-N. The user interface views provide an option to the one or more user's 102A-N to add the one or more objects 112A1-Nn to the application ID. In one embodiment, the one or more objects 112A1-Nn may be searched across the one or more data centers 110A-N on granular object level. In another embodiment, the user interface views provide an option to the one or more user's 102A-N to search for the one or more devices by selecting a device option 606. The user interface views provide an option to add the one or more devices to the application ID by selecting an add option 608.

Figure 7:
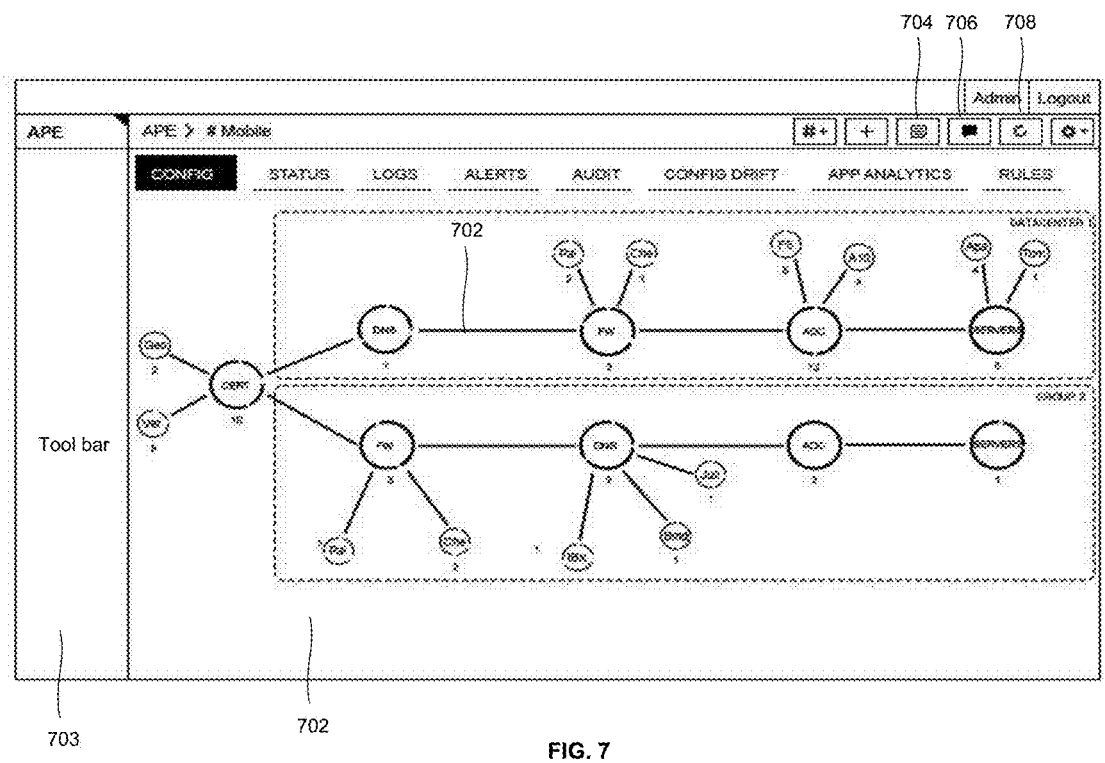
FIG. 7 illustrates a graphical representation of the application ID according to an embodiment herein.

FIG. 7 illustrates a graphical representation of the application ID according to an embodiment herein. A graphical representation 702 of the application ID displays the one or more objects 112A1-Nn that is associated with a device category (i.e. a domain name system (DNS), a firewall device (FW), an application delivery controller (ADC), a network router, a network switch, and a server). The graphical representation 702 provides an option to the one or more user's 102A-N to search for the one or more objects 112A1-Nn across the one or more data centers 110A-N. In one embodiment, the searched one or more objects 112A1-Nn may be added to a device category. The graphical representation 702 further includes (i) a note option 704 to add notes to the one or more objects 112A1-Nn, (iii) a chat option 706 to chat with the one or more user's 102A-N and/or an administrator, and (iv) a refresh option 708 to refresh the application ID (i.e. to restore the previous settings in the application ID). The graphical representation 702 is further configured to provide a status of the one or more objects 112A1-Nn managed within the application ID. In one embodiment, the graphical representation 702 includes a tool bar 703 that is configured to drag and drop new device/objects to the application ID based on a type of device/object to be tagged.

Figure 8A:
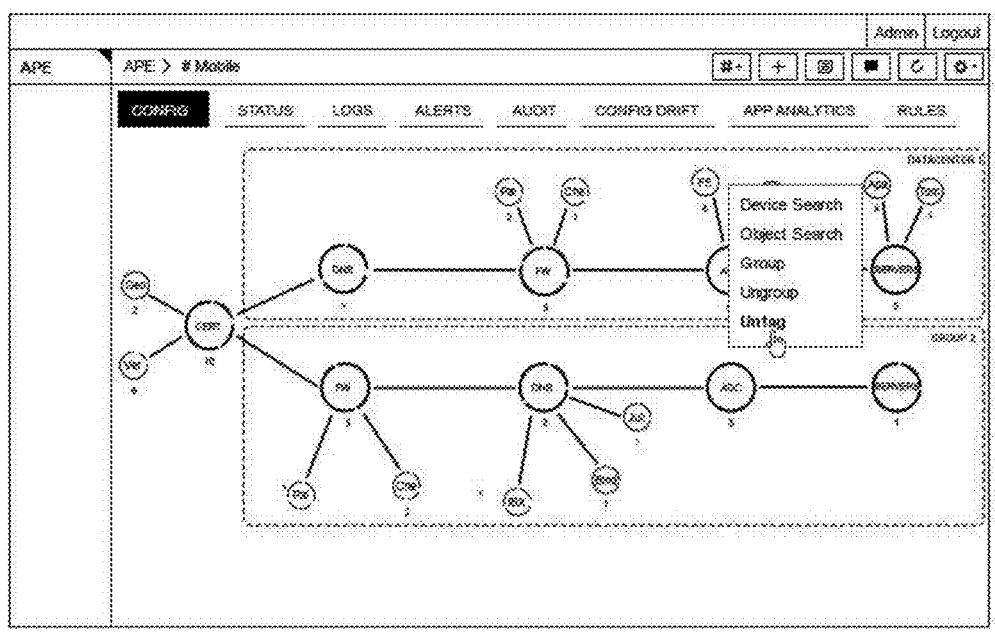
FIGS. 8A and 8B illustrate user interface views of an un-tag module of the application management system of FIG. 1 according to an embodiment herein.
Figure 8B:
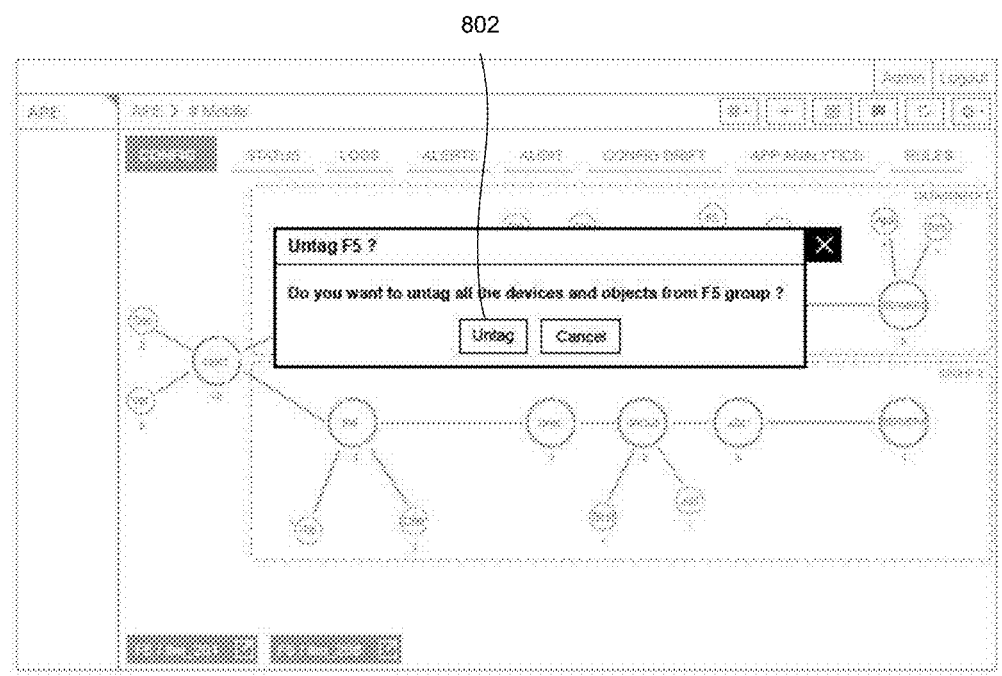

FIGS. 8A and 8B illustrate user interface views of an un-tag module of the application management system 106 of FIG. 1 according to an embodiment herein. The user interface views provide an option to the one or more user's 102A-N to un-tag the one or more objects 112A1-Nn from the application ID when the one or more user's 102A-N right clicks on the one or more objects 112A1-Nn. The application management system 106 provides log details to the one or more user's 102A-N when the one or more objects 112A1-Nn are removed/untagged from the application ID. In one embodiment, the one or more user's 102A-N selects an un-tag option 802 to remove the selected one or more objects 112A1-Nn from the application ID.

Figure 9A:
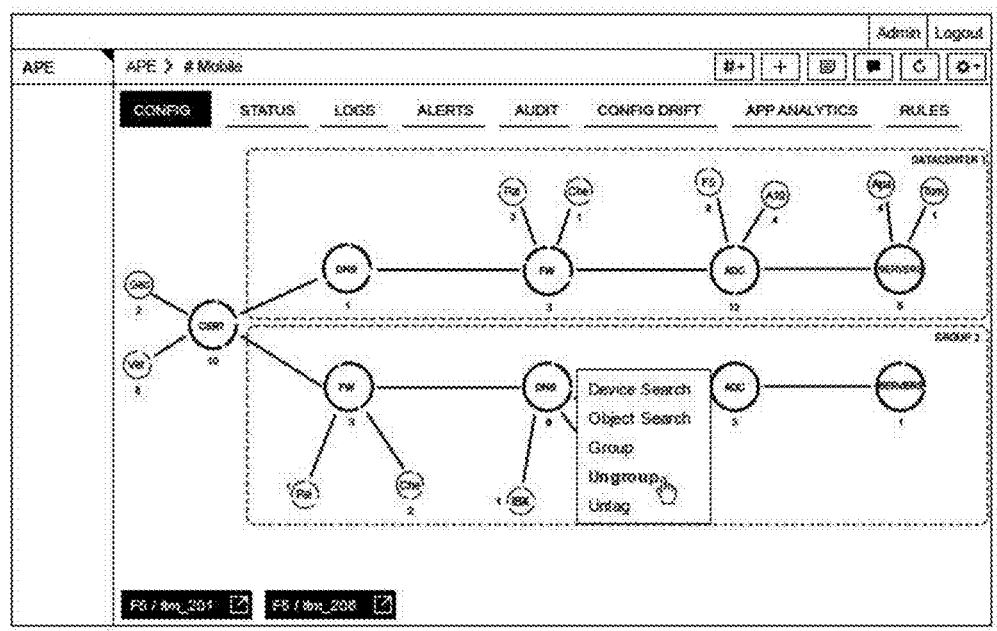
FIGS. 9A and 9B illustrate user interface views of an un-group module of the application management system of FIG. 1 according to an embodiment herein.
Figure 9B:
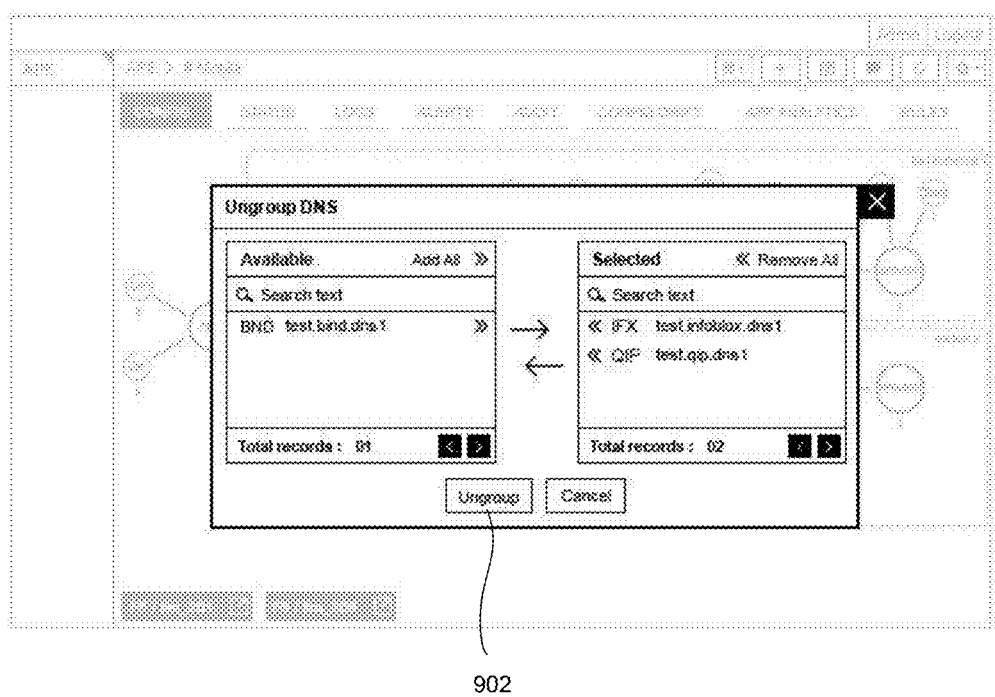

FIGS. 9A and 9B illustrate user interface views of an un-group module of the application management system 106 of FIG. 1 according to an embodiment herein. The user interface views provide an option to the one or more user's 102A-N to un-group the one or more objects 112A1-Nn (e.g., a certificate, a domain name system (DNS), records of the domain name system (DNS), a firewall device (FW), a rule of the firewall device, an application delivery controller (ADC), an object of the application delivery controller (ADC), a network router, a network switch, and a server) from the application ID. In one embodiment, the user interface views provide an un-group option 902 to the one or more user's 102A-N when the one or more user's 102A-N right clicks on the selected one or more objects 112A1-Nn to un-group the one or more objects 112A1-Nn from the application ID. In another embodiment, the user interface views provide the one or more objects 112A1-Nn that is managed within the application ID when the one or more user's 102A-N selects the un-group option 902. The one or more user's 102A-N may un-group the selected object 112 from a selected device category by selecting the un-group option 902. In another embodiment, the one or more user's 102A-N may add the one or more objects 112A1-Nn that are selected from the application ID to a new application ID.

Figure 10A:
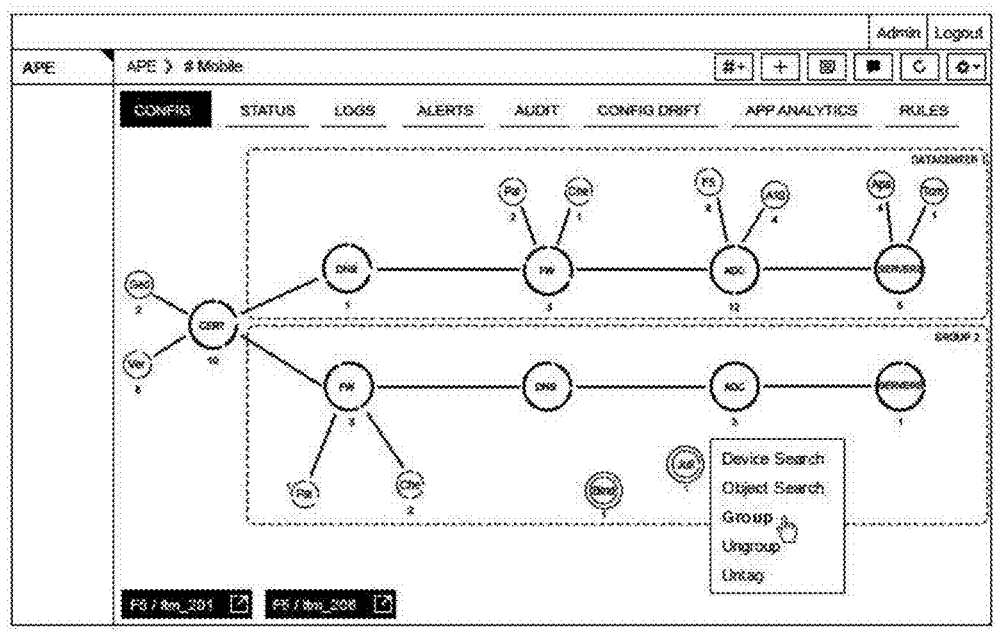
FIGS. 10A and 10B illustrate user interface views of a group module of the application management system of FIG. 1 according to an embodiment herein.
Figure 10B:
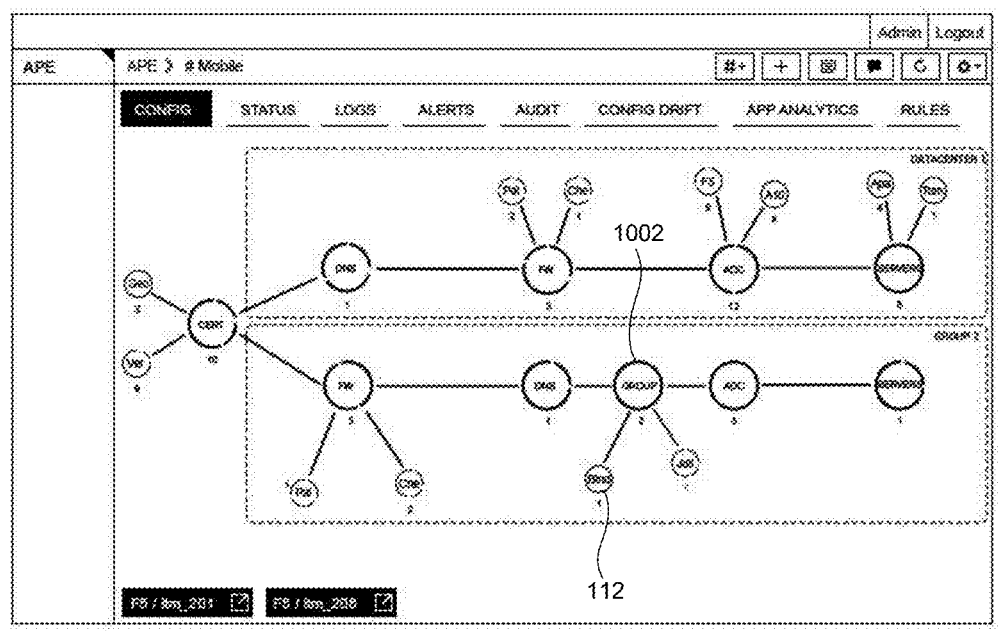

FIGS. 10A and 10B illustrate user interface views of a group module of the application management system 106 of FIG. 1 according to an embodiment herein. The user interface views provide an option to the one or more user's 102A-N to group the one or more objects 112A1-Nn to the application ID. In one embodiment, the user interface views provide a group option to the one or more user's 102A-N when the one or more user's 102A-N right clicks on one or more objects 112A1-Nn to group the one or more objects 112A1-Nn to the application ID. In another embodiment, a new group 1002 is created by grouping the one or more object 112A1-Nn. The user interface views provide a group option to one or more user's 102A-N to group the one or more object 112A1-Nn to the existing device category. In one embodiment, the user interface views provide an option to the one or more user's 102A-N to edit a group name.

Figure 11:
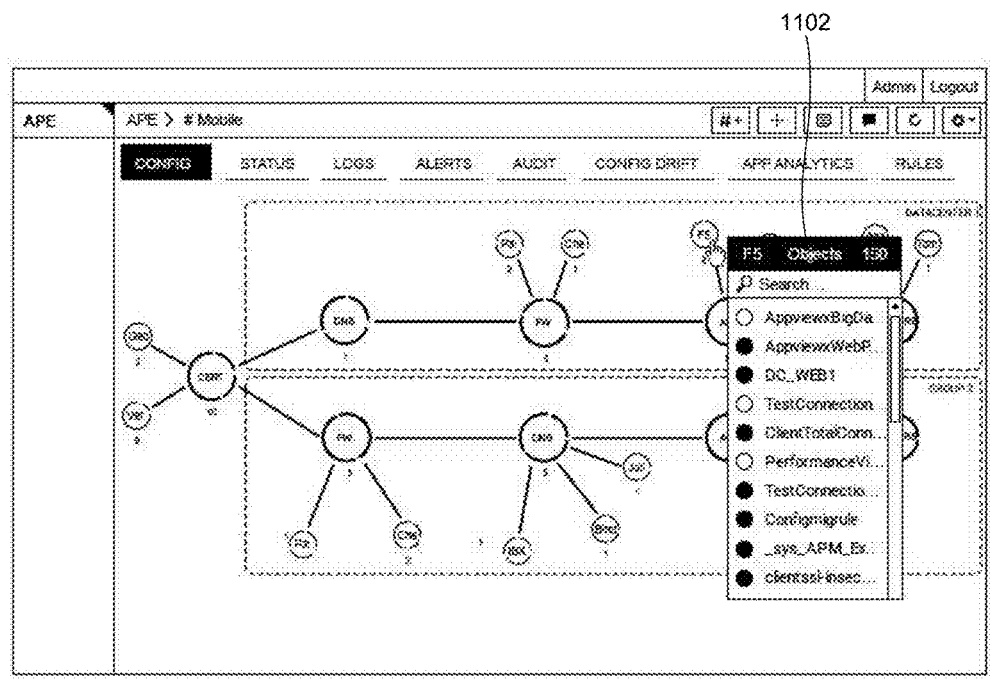
FIGS. 11 and 12 illustrate user interface views of a search module of the application management system of FIG. 1 according to an embodiment herein.
Figure 12:
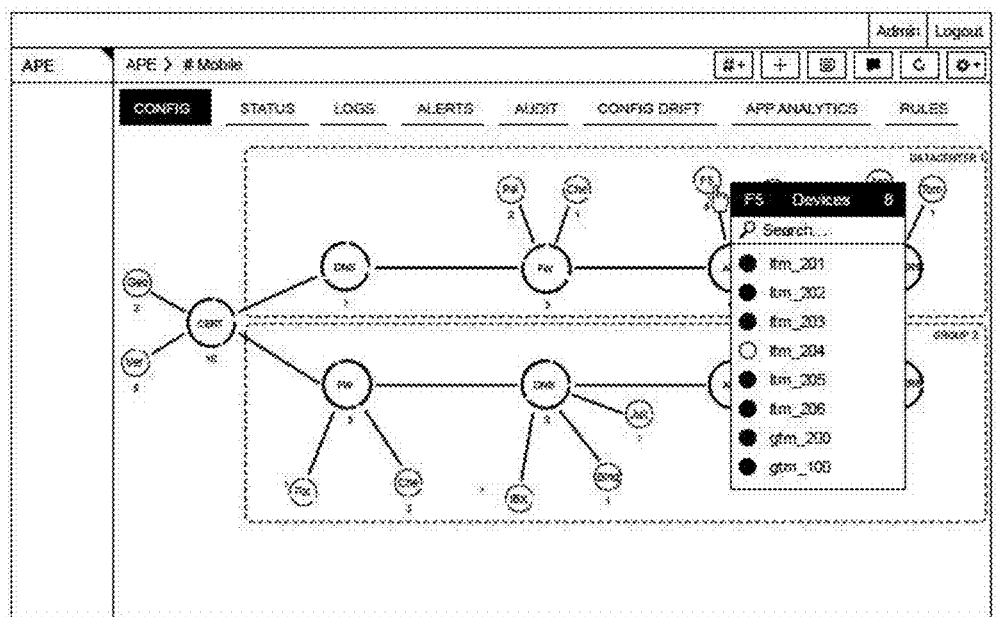

FIGS. 11 and 12 illustrate user interface views of a search module of the application management system 106 of FIG. 1 according to an embodiment herein. The user interface views provide an option to the one or more user's 102A-N to search the one or more objects 112A1-Nn. In one embodiment, the one or more objects 112A1-Nn includes a device. The user interface views provide an object search option 1102 to the one or more user's 102A-N to search the one or more objects 112A1-Nn (e.g., a device/objects of a device) when the one or more user's 102A-N right clicks on a device/object 112 (e.g., F5). In one embodiment, the user interface views provide a list of objects that are managed within the application ID when the one or more user's 102A-N selects the object search option 1102. In one embodiment, the one or more objects 112A1-Nn may be searched using keywords. In another embodiment, the one or more user's 102A-N may uncheck and/or un-tag the one or more objects 112A1-Nn that are listed as search result based on the keyword from the application ID. When one or more user's 102A-N selects an object 112 from the search result, the user interface views provide the following options to manage the one or more objects 112A1-Nn: (i) Configuration of selected object 112, (ii) Secure Shell (SSH) of selected object 112, (iii) Physical Layout of selected object 112, and (iv) Tagging details of selected object 112 with existing application ID's.

Figure 13:
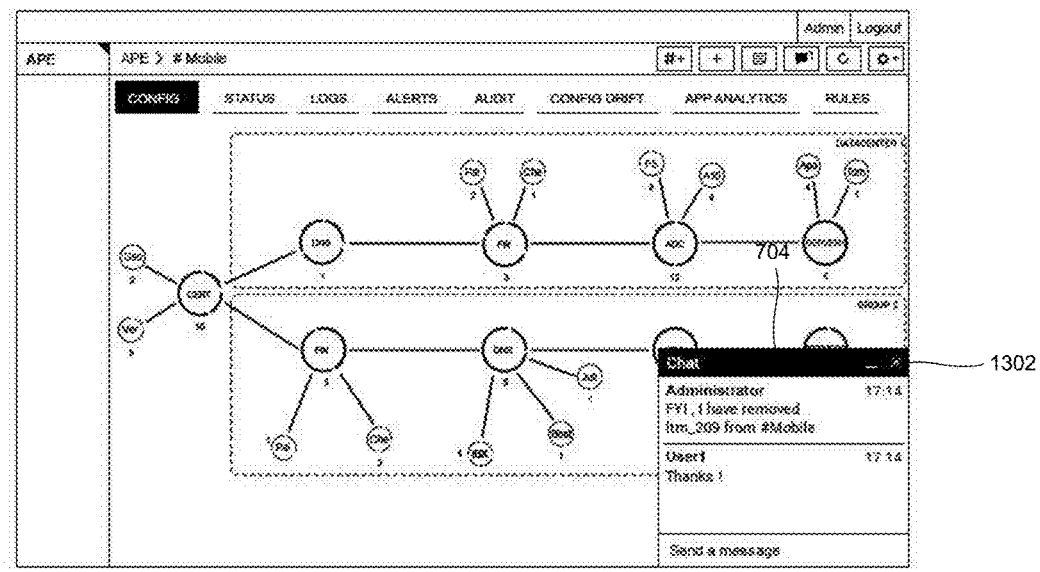
FIG. 13 illustrates a user interface view of a chat module of the application management system of FIG. 1 according to an embodiment herein.

FIG. 13 illustrates a user interface view of a chat module of the application management system 106 of FIG. 1 according to an embodiment herein. The user interface view provides an option to the one or more user's 102A-N to chat with other users who has access to the application ID. In one embodiment, the user interface view provides an option to the one or more other users 102A-N to send a chat message to an administrator/other users. In one embodiment, the chat message may be entered in the chat window 1302 to sends to a group of users who has access to the application ID. In another embodiment, the application management system 106 provides a notification to the one or more user's 102A-N when a new chat message is received.

Figure 14:
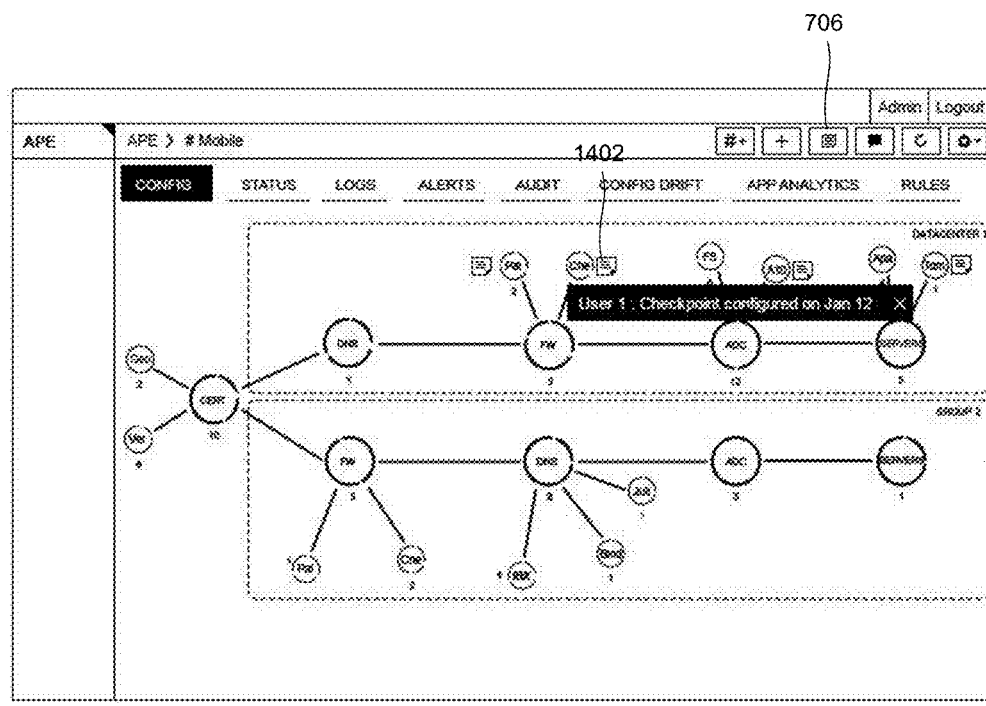
FIG. 14 illustrates a user interface view of a note module of the application management system of FIG. 1 according to an embodiment herein.

FIG. 14 illustrates a user interface view of a note module of the application management system 106 of FIG. 1 according to an embodiment herein. The user interface view provides an option to the one or more user's 102A-N to add a note to the selected device/objects (i.e. one or more objects 112A1-Nn). The user interface provides a note option 706 to the one or more user's 102A-N to add a note to the selected one or more objects 112A1-Nn. When the one or more user's 102A-N selects the note option 706, the user interface view provides a text area to add a note to the one or more objects 112A1-Nn. In one embodiment, the user interface view allows the one or more user's 102A-N who has the access to the application ID, to view a note 1402 added to the one or more objects 112A1-Nn.

Figure 15A:
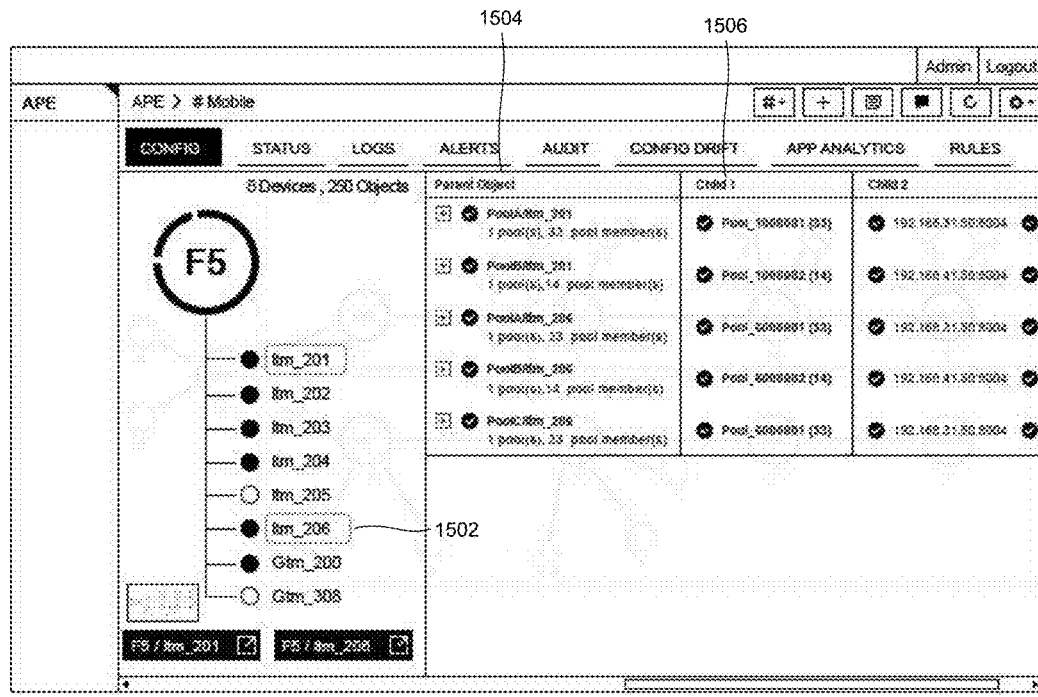
FIGS. 15A and 15B illustrate user interface views of an ADC managing module of the application management system of FIG. 1 according to an embodiment herein.
Figure 15B:
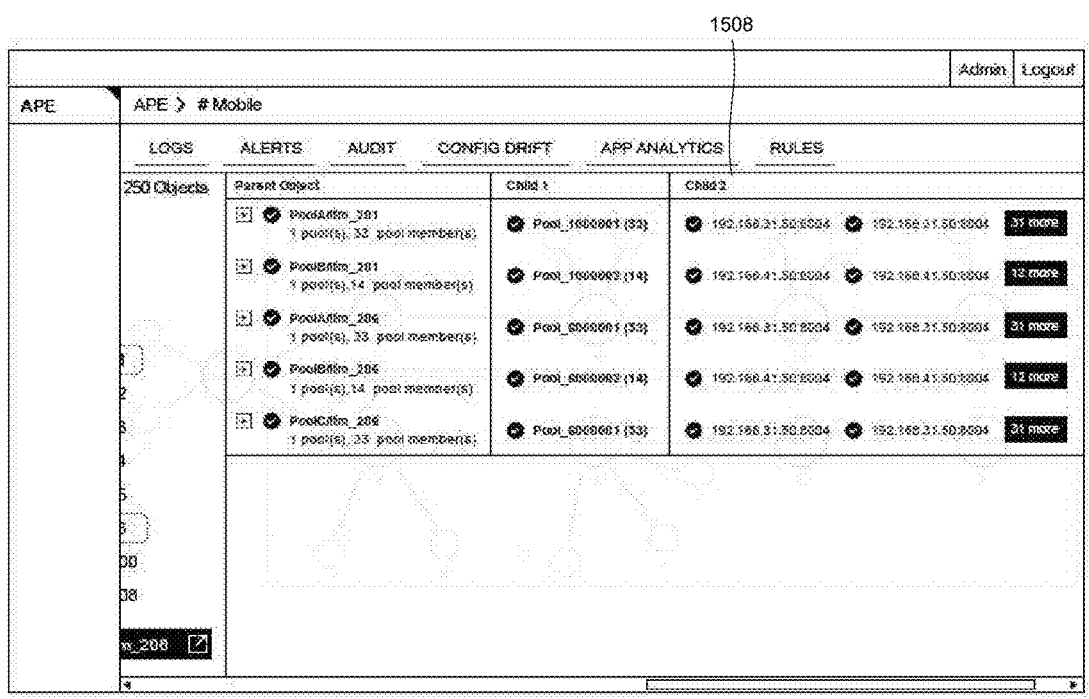
Figure 15C:
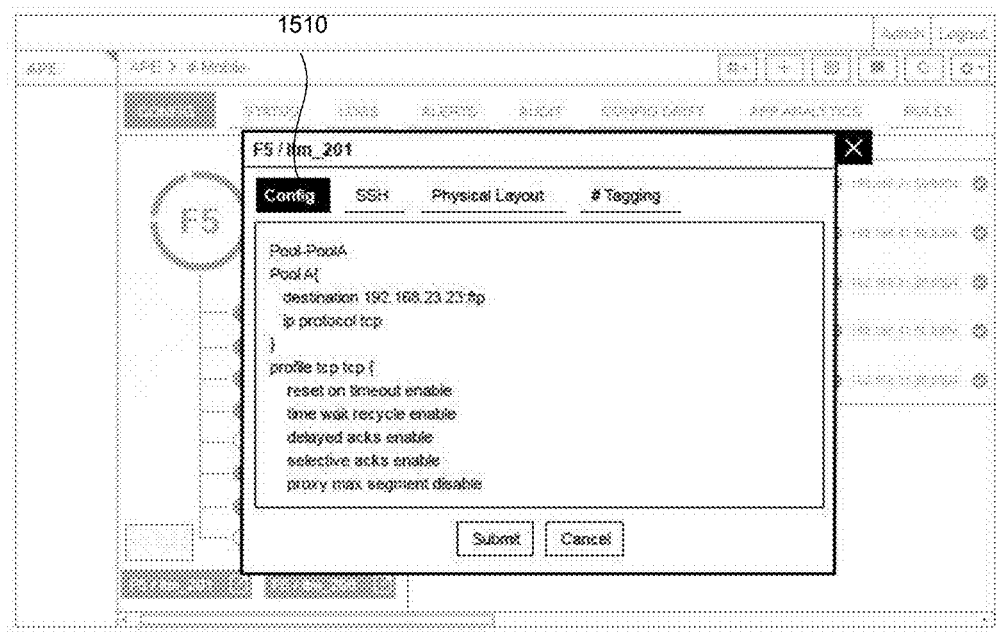
FIGS. 15C-15F illustrate user interface views that provides details of the ADC device according to an embodiment herein.
Figure 15D:
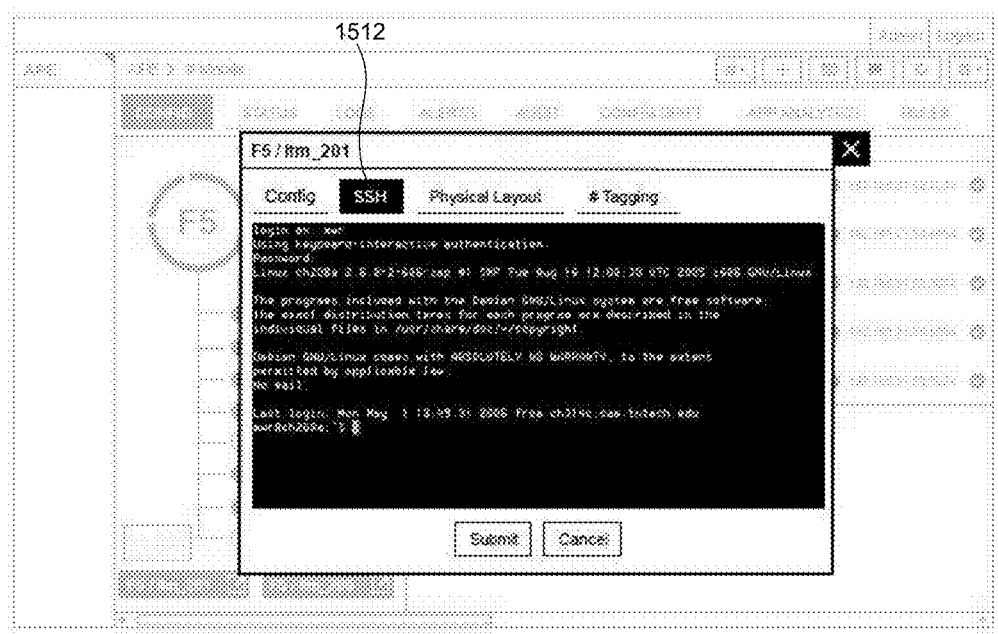
Figure 15E:
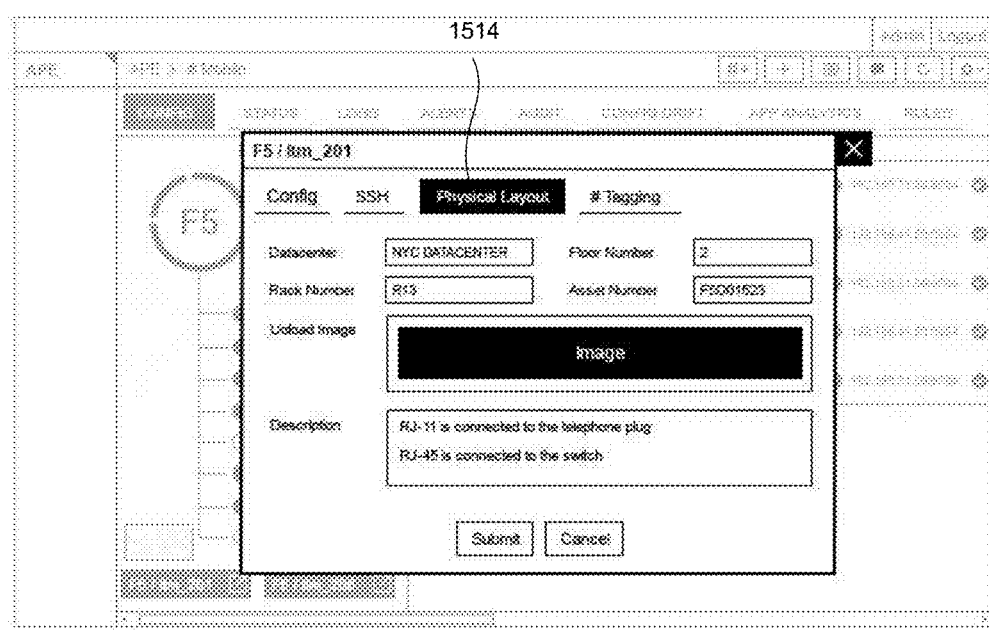
Figure 15F:
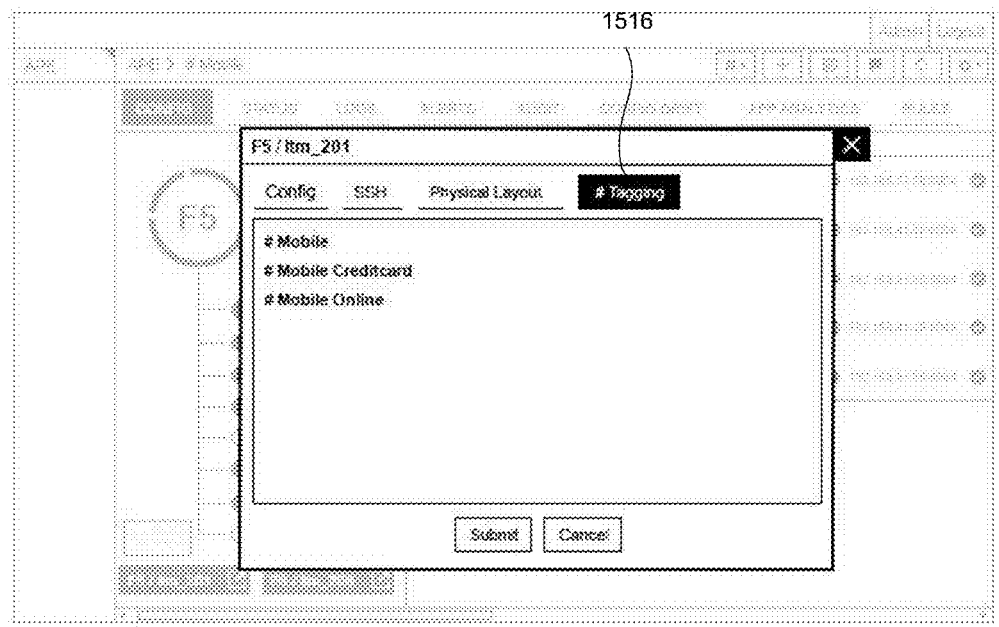

FIGS. 15A and 15B illustrate user interface views of an ADC managing module of the application management system 106 of FIG. 1 according to an embodiment herein. The user interface views of the ADC managing module provide an option to the one or more user's 102A-N to manage the one or more objects 112A1-Nn of an ADC device. The user interface views of the ADC managing module provide a list of objects (i.e. the one or more objects 112A1-Nn) of the ADC device in an object list field 1502 that are managed within the application ID when the one or more user's 102A-N selects an ADC device. When the one or more user's 102A-N selects an object 112 from the list of objects, the user interface views of the ADC managing module provide the following options to manage the selected object 112 of the ADC device: (i) Configuration of the selected object 112, (ii) SSH of the selected object 112, (iii) Physical Layout of the selected object 112, and (iv) Tagging details of the selected object 112 with existing application ID's. The user interface views of the ADC managing module further include a parent object field 1504, a child 1 field 1506, and a child 2 field 1508. The parent object field 1504 displays a parent object of each of the one or more objects 112A1-Nn. The child 1 field 1506 displays a first child of the parent object for each of the one or more objects 112A1-Nn. The child 2 field 1508 displays a second child of the parent object for each of the one or more objects 112A1-Nn. In one embodiment, the parent object includes N no. of child fields.

FIGS. 15C-15F illustrate user interface views that provides details of the ADC device according to an embodiment herein. The user interface views provide configuration details of the ADC device when the one or more user's 102A-N selects a configuration option 1510. The user interface views provide SSH (secure shell) connectivity details of the ADC device when the one or more user's 102A-N selects a SSH option 1512. The user interface views provide a physical layout of the ADC device when the one or more user's 102A-N selects a physical layout option 1514. The user interface views provide tag details of the ADC device (i.e. details of tagging the ADC device with existing application ID's) when the one or more user's 102A-N selects a tagging option 1516.

Figure 16:
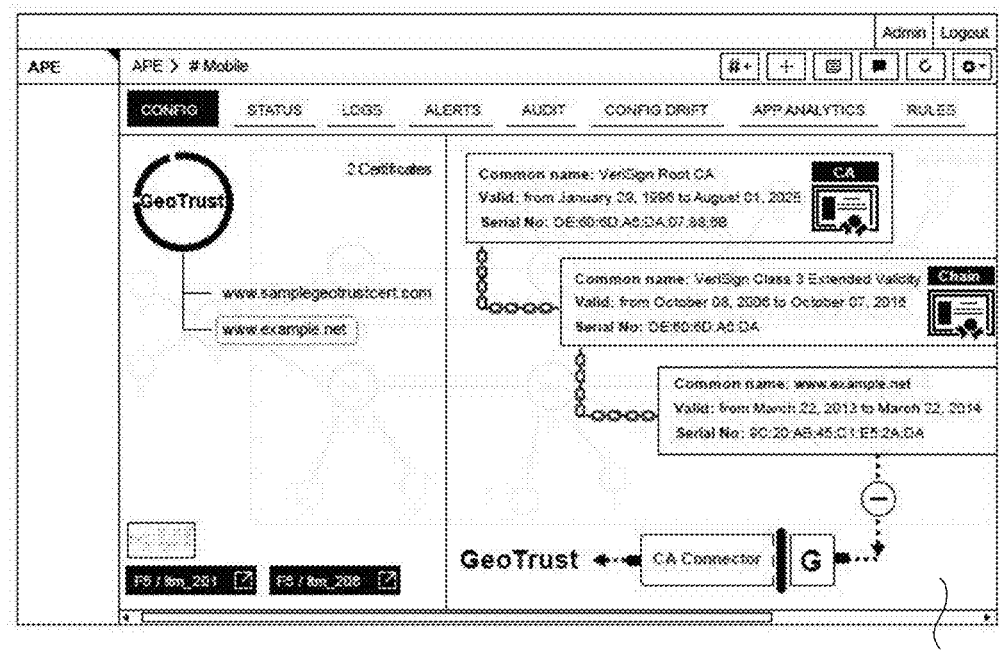
FIG. 16 illustrates a user interface view of a certificate managing module of the application management system of FIG. 1 according to an embodiment herein.

FIG. 16 illustrates a user interface view of a certificate managing module of the application management system

106 of FIG. 1 according to an embodiment herein. The user interface view of the certificate managing module provides an option to the one or more user's 102A-N to manage the certificates. The user interface view of the certificate managing module displays a list of certificates (i.e. the one or more objects 112A1-Nn) that is managed within the application ID when the one or more user's 102A-N selects a vendor, or a device category. When the one or more user's 102A-N selects a certificate from the list of certificates, the user interface view of the certificate managing module provides a holistic view 1602 of the selected certificate with appropriate chain structure. In one embodiment, when the one or more user's 102A-N right clicks on the certificate, the user interface view of the certificate managing module may provide (i) un-tag option to un-tag the selected certificate from a certificate category/the application ID, (ii) un group option to ungroup the selected certificate from a certificate category/the application ID, (iii) group option to group the selected certificate with the selected certificate category/the application ID, and (iv) search option to search the one or more certificates on a granular object level. In one embodiment, the user interface view of the certificate managing module provides the holistic view 1602 that allows the one or more user's 102A-N to navigate to a required certificate from the list of certificates.

Figure 17A:
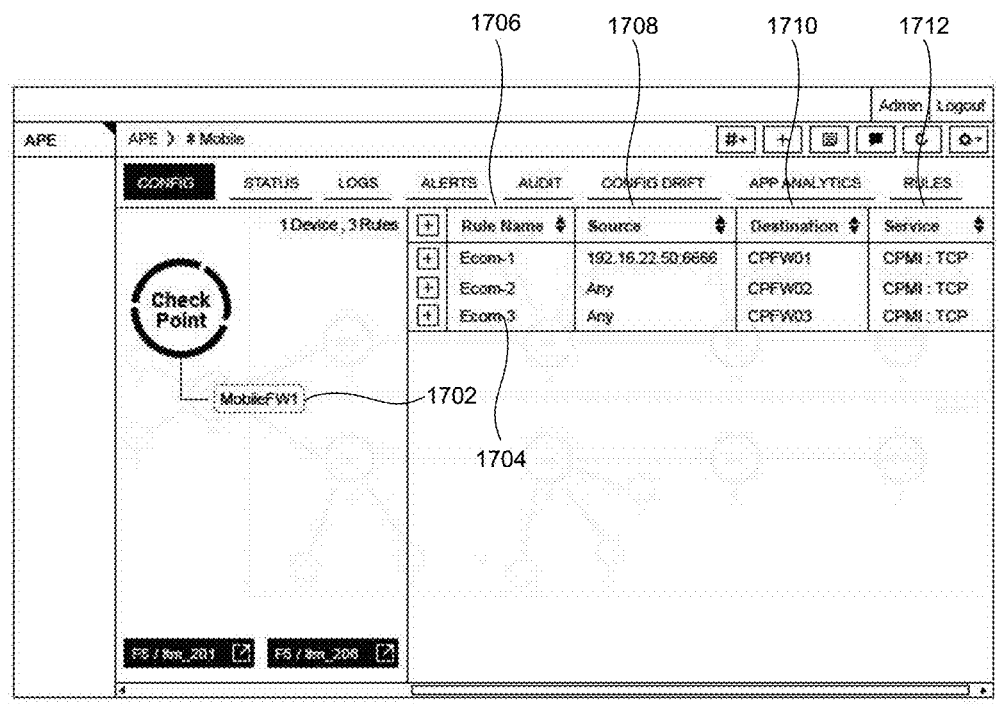
FIGS. 17A and 17B illustrate user interface views of a firewall managing module of the application management system of FIG. 1 according to an embodiment herein.
Figure 17B:
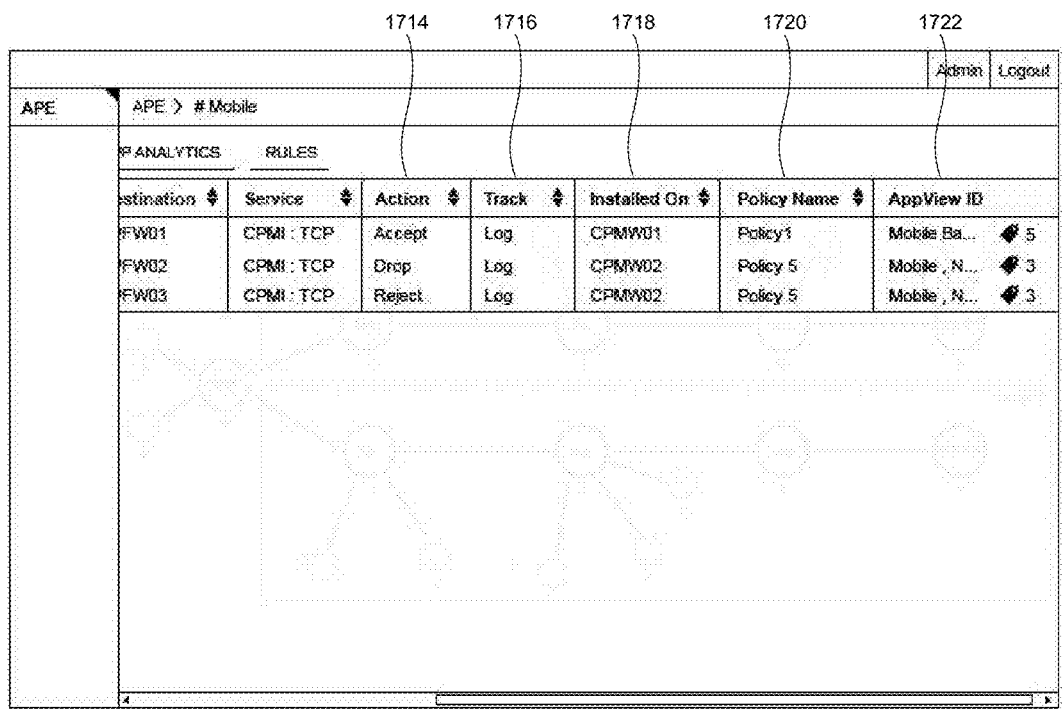

FIGS. 17A and 17B illustrate user interface views of a firewall managing module of the application management system 106 of FIG. 1 according to an embodiment herein. The user interface views of the firewall managing module provide an option to the one or more user's 102A-N to manage a firewall device. The user interface views of the firewall managing module is configured to provide (i) a firewall field 1702 that lists one or more firewall devices (i.e. the one or more objects 112A1-Nn), and (ii) a rules field 1704 that includes rules (i.e. the one or more objects 112A1-Nn) of the firewall devices that are managed within the application ID when the one or more user's 102A-N selects a firewall device (i.e. device category). In one embodiment, the user interface views of the firewall managing module provide a list of rules of the firewall device that are tagged to the application ID when the one or more user's 102A-N selects a firewall device from the one or more firewall devices. The user interface views of the firewall managing module include details of the rules as follows: (i) a rule name 1706, (ii) a source of the rule 1708, (iii) a destination of the rule 1710, (iv) a service provided 1712, (v) an action performed by the rule 1714, (vi) a track details of the rule 1716, (vii) installation details of the rule 1718, (viii) a policy name of the rule 1720, and (ix) an application ID of the rule 1722.

Figure 18:
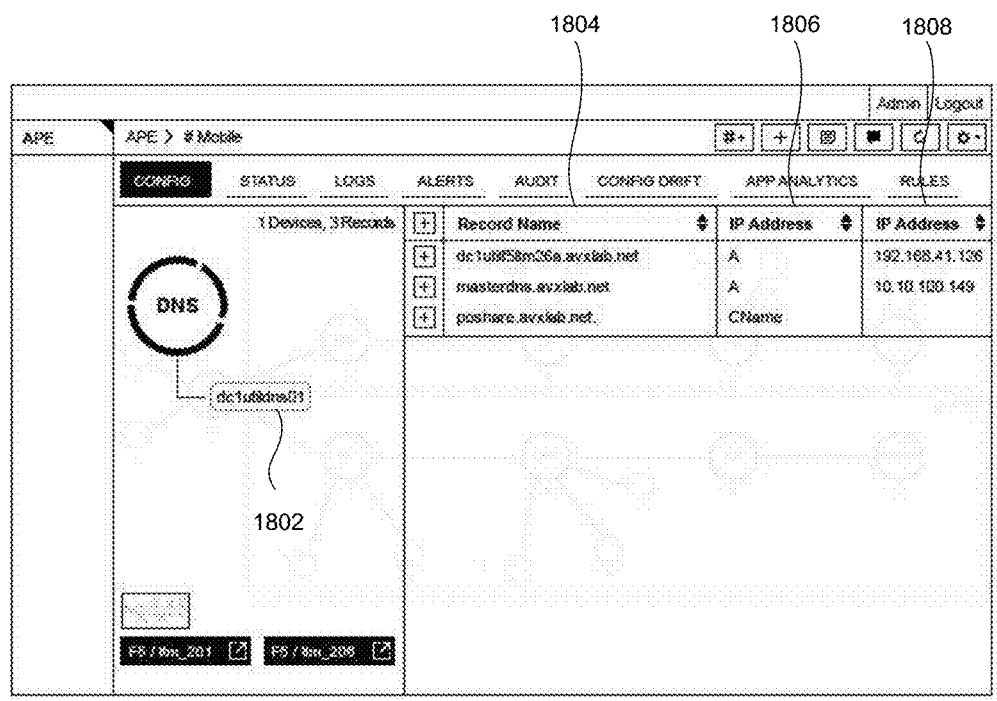
FIG. 18 illustrates a user interface view of a domain name system (DNS) managing module of the application management system of FIG. 1 according to an embodiment herein.

FIG. 18 illustrates a user interface view of a domain name system (DNS) managing module of the application management system 106 of FIG. 1 according to an embodiment herein. The user interface view of the DNS managing module provides an option to the one or more user's 102A-N to manage the domain name system (DNS). The user interface view of the DNS managing module provides a DNS field 1802 that lists one or more DNS (i.e. the one or more objects 112A1-Nn) that are managed within the application ID when the one or more user's 102A-N selects a DNS (i.e. device category). The user interface view of the DNS managing module provides one or more records (i.e. the one or more objects 112A1-Nn) of the DNS when the one or more user's 102A-N selects the DNS from the one or more DNS. The user interface view of the DNS managing module includes details of the DNS as follows: (i) a record name 1804, (ii) a record type 1806, and (iii) IP address of the record 1808.

Figure 19:
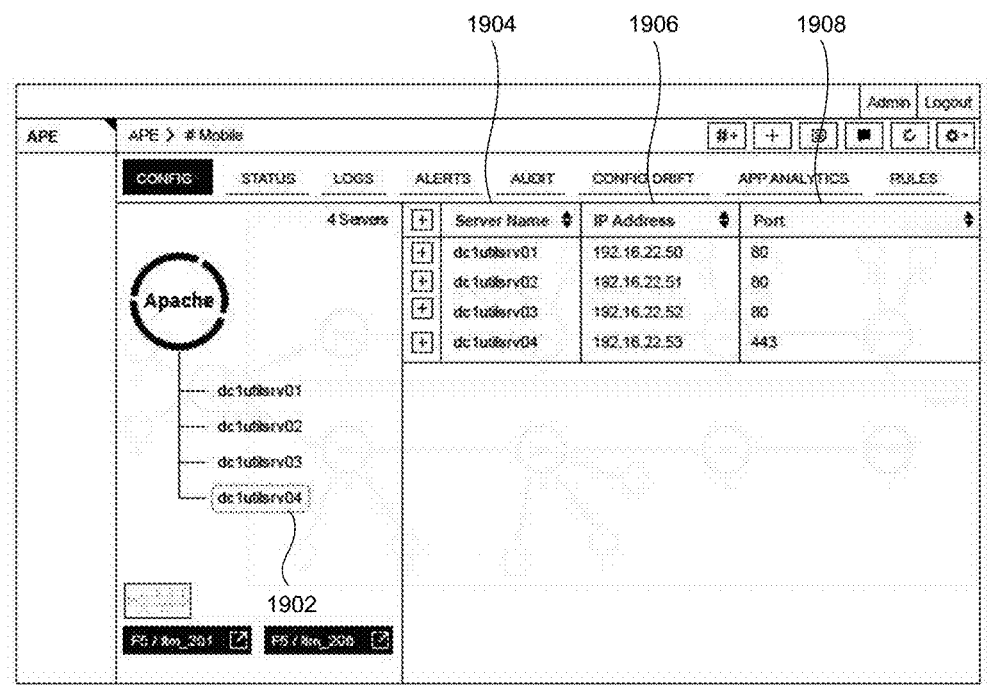
FIG. 19 illustrates a user interface view of a server managing module of the application management system of FIG. 1 according to an embodiment herein.

FIG. 19 illustrates a user interface view of a server managing module of the application management system 106 of FIG. 1 according to an embodiment herein. The user interface view of the server managing module provides an option to the one or more user's 102A-N to manage a server. The user interface view of the server managing module provides a server field 1902 that lists one or more server that are managed within the application ID when the one or more user's 102A-N selects a server (i.e. device category). When the one or more user's 102A-N selects a server from the one or more server, the user interface view of the server managing module provides a host information specific to the DNS. In one embodiment, the server managing module automatically creates the server to manage the traffic overload between the server and the one or more objects 112A1-Nn. The user interface view of the server managing module includes details of the server as follows: (i) a server name 1904, (ii) IP address of the server 1906, and (iii) a port of the server 1908.

Figure 20:
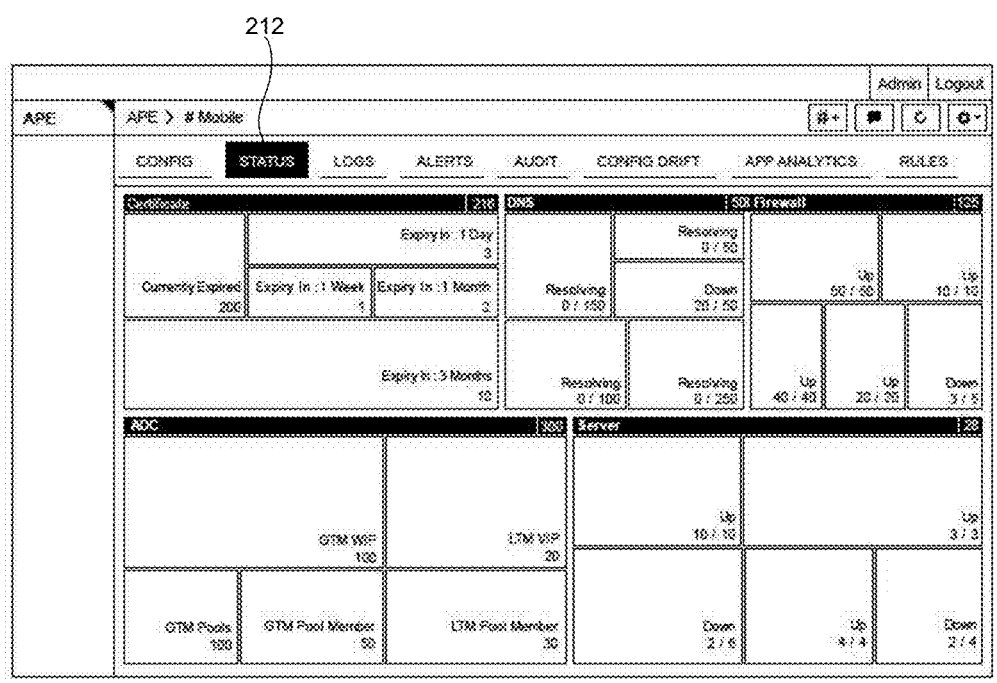
FIG. 20 illustrates a user interface view of a status module of the application management system of FIG. 1 according to an embodiment herein.

FIG. 20 illustrates a user interface view of the status module 212 of the application management system 106 of FIG. 1 according to an embodiment herein. The user interface view of the status module 212 provides a status of the one or more objects 112A1-Nn that are managed within the application ID. The status module 212 provides the status of a selected object 112 when the one or more user's 102A-N selects an object 112 from the one or more objects 112A1-Nn.

Figure 21:
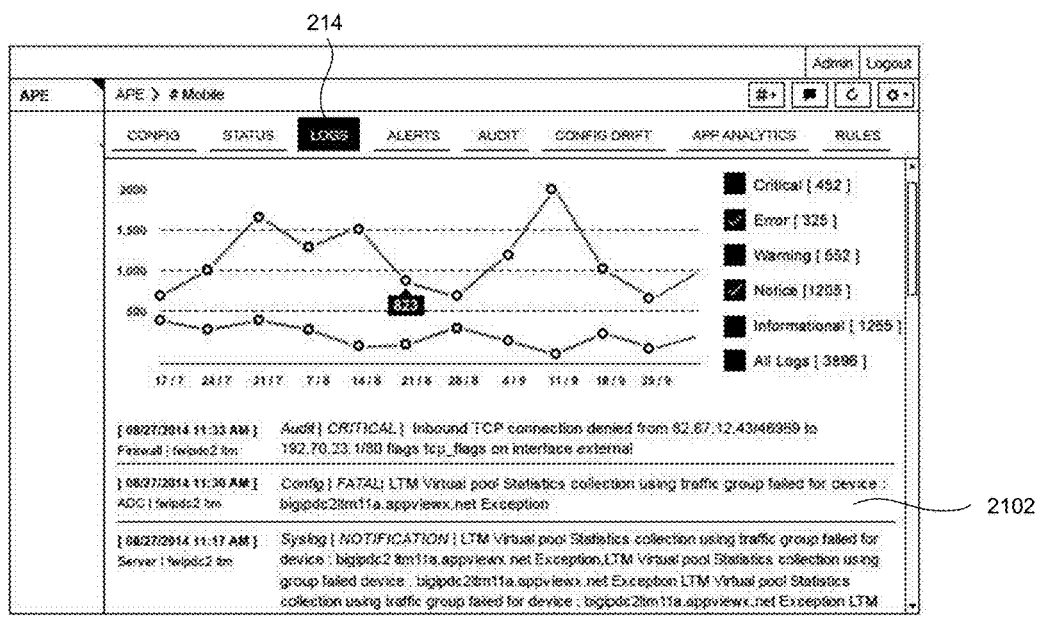
FIG. 21 illustrates a user interface view of a log module of the application management system of FIG. 1 according to an embodiment herein.

FIG. 21 illustrates a user interface view of a log module 214 of the application management system 106 of FIG. 1 according to an embodiment herein. The user interface view of the log module 214 provides a graphical depiction of logs of the one or more objects 112A1-Nn based on severity. In one embodiment, the log module 214 provides logs of the one or more objects 112A1-Nn that are managed within the application ID. The user interface view of the log module 214 displays a specification 2102 of the application ID below the graphical depiction. In one embodiment, the user interface view of the log module 214 provides the graphical depiction and log details of a selected object 112 when the one or more user's 102A-N selects an object 112 from the one or more objects 112A1-Nn.

Figure 22:
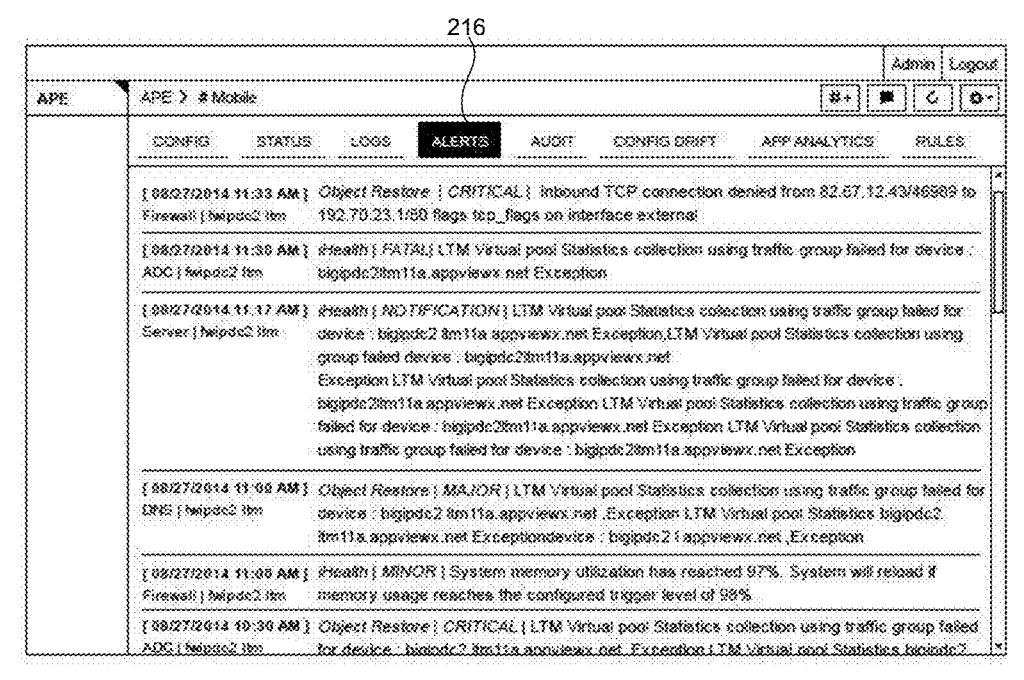

FIG. 22 illustrates a user interface view of an alert module 216 of the application management system 106 of FIG. 1 according to an embodiment herein. The user interface view of the alert module 216 provides an alert (i.e. indication) regarding the details the one or more objects 112A1-Nn that are managed within the application ID to the one or more users 102A-N. In one embodiment, the user interface view of the alert module 216 provides the alert regarding a selected object 112 when the one or more user's 102A-N selects an object 112 from the one or more objects 112A1-Nn.

Figure 23:
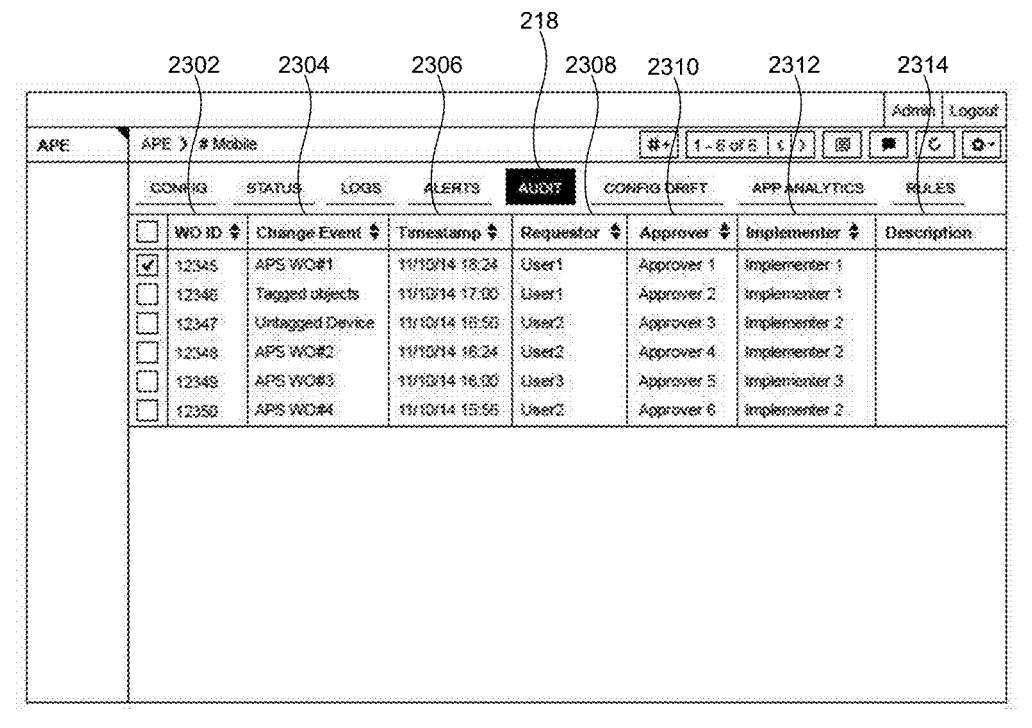

FIG. 23 illustrates a user interface view of an audit module 218 of the application management system 106 of FIG. 1 according to an embodiment herein. The user interface view of the audit module 218 is configured to check the work order and the configuration changes of the one or more objects 112A1-Nn that are managed within the application ID. The user interface view of the audit module 218 further provides the work order and the configuration changes occurred over a period of time. The user interface view of the audit module 218 checks and provides the work order and configuration changes of a selected object 112 when the one or more user's 102A-N selects an object 112 from the one or more objects 112A1-Nn. The user interface view of the audit module 218 further provides details of the work order as follows: (i) a work order ID 2302, (ii) a change event 2304, (iii) a time stamp 2306, (iv) a requestor of the audit 2308, (v) an approver of the audit 2310, (vi) an implementer of the audit 2312, and (vii) description about the work order ID 2314.

Figure 24A:
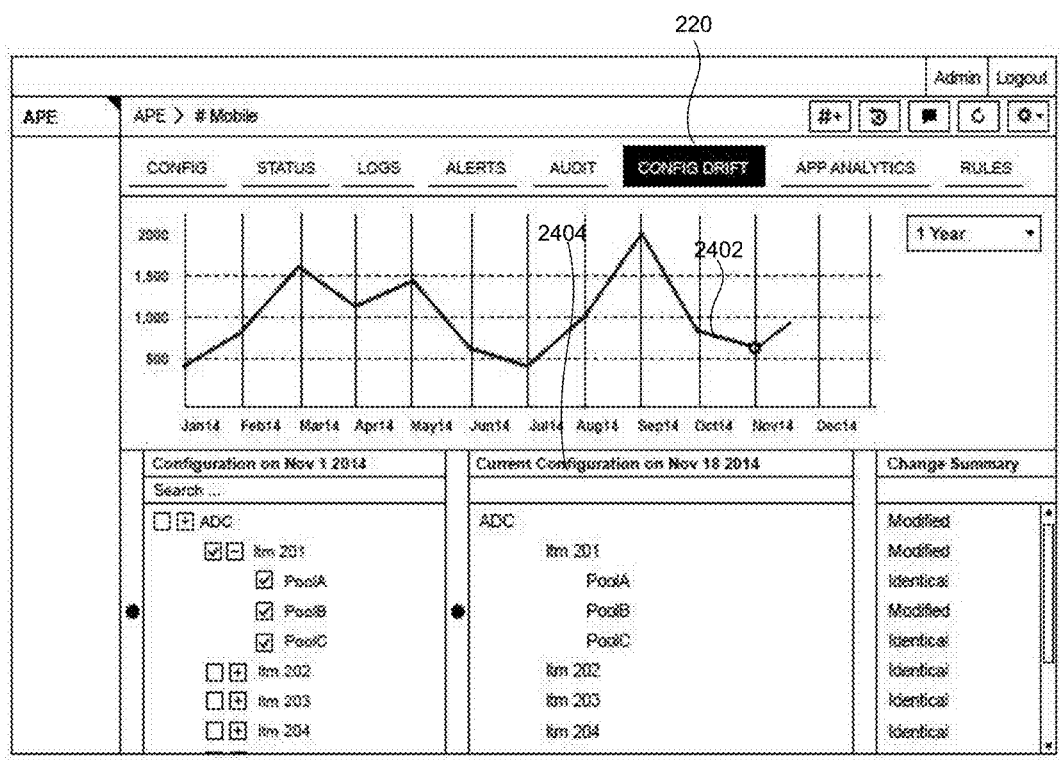
FIGS. 24A-24C illustrate user interface views of a configuration drift module of the application management system of FIG. 1 according to an embodiment herein.
Figure 24B:
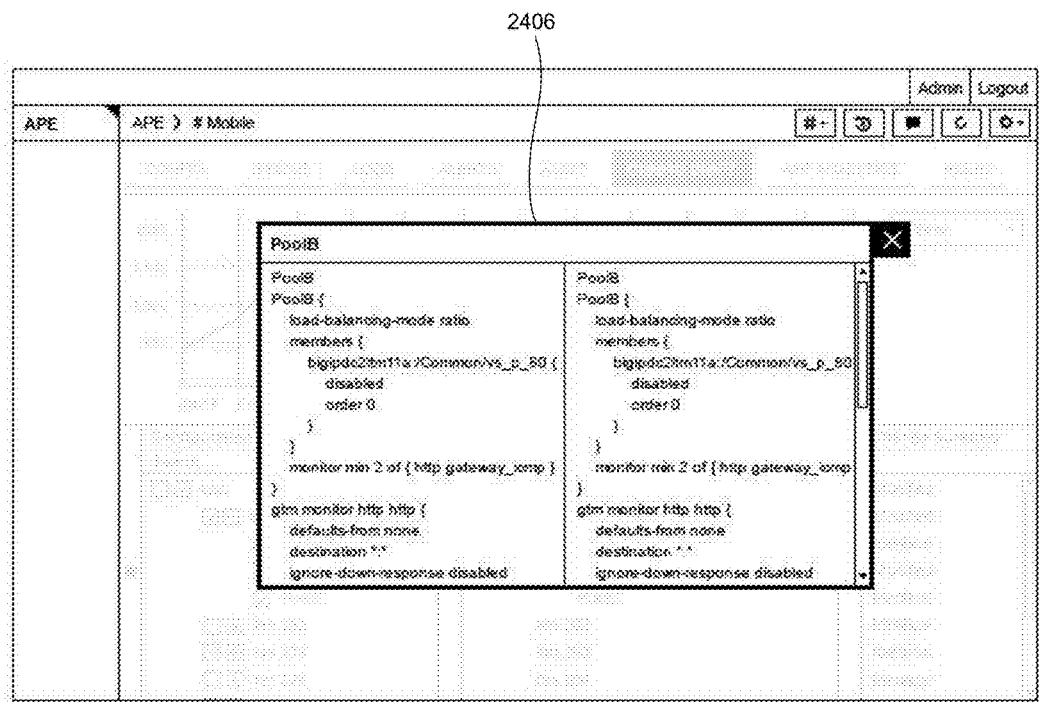
Figure 24C:
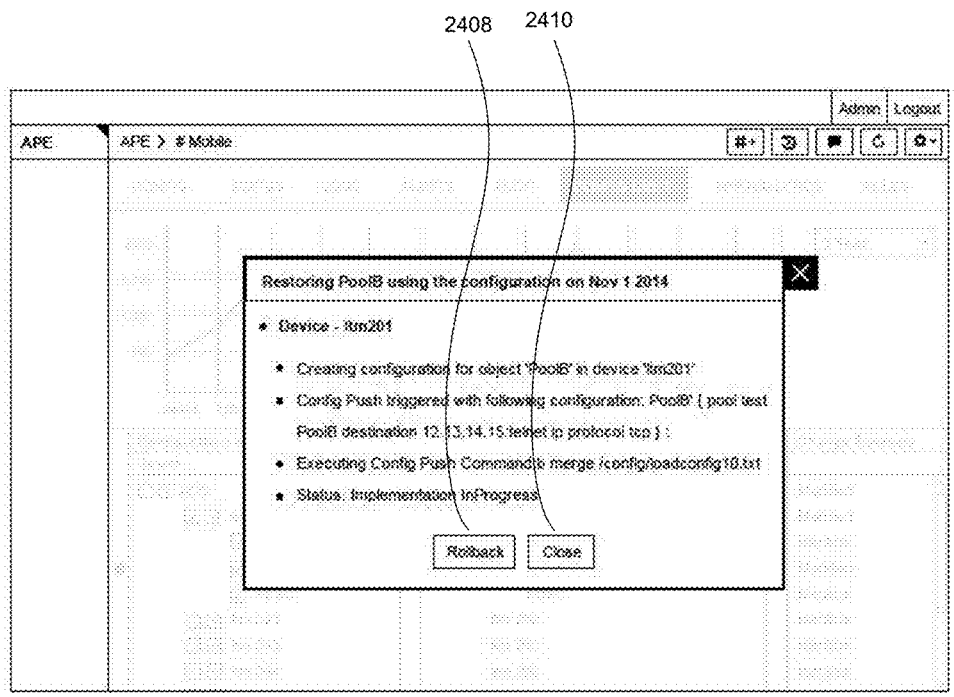

FIGS. 24A-24C illustrate user interface views of a configuration drift module 220 of the application management system 106 of FIG. 1 according to an embodiment herein. The user interface views of the configuration drift module 220 provide a graphical depiction 2402 of the configuration changes occurred on the one or more objects 112A1-Nn over a period of time. The one or more users 102A-N may slide over the graphical depiction 2402 to view a summary 2404 of the configuration changes occurred on the one or more objects 112A1-Nn. In one embodiment, the summary 2404 of the configuration changes occurred on the one or more objects 112A1-Nn on a selected time frame is displayed when the one or more user's 102A-N slides over the graphical depiction 2402. In one embodiment, the graphical depiction 2402 of the one or more objects 112A1-Nn includes a hyperlink to provide a comparison view 2406 of the configuration changes occurred on the one or more objects 112A1-Nn over a period of time. The user interface views provide an option to compare the configuration changes when the one or more user's 102A-N selects the one or more objects 112A1-Nn from the summary 2404. The user interface views provide an option to the one or more user's 102A-N to restore the one or more objects 112A1-Nn when the one or more user's 102A-N selects the one or more objects 112A1-Nn from the summary 2404. The user interface views provide a rollback option 2408 to one or more user's 102A-N to restore the summary 2404. The pop up window is closed while the one or more user's 102A-N selects a close option 2410.

Figure 25:
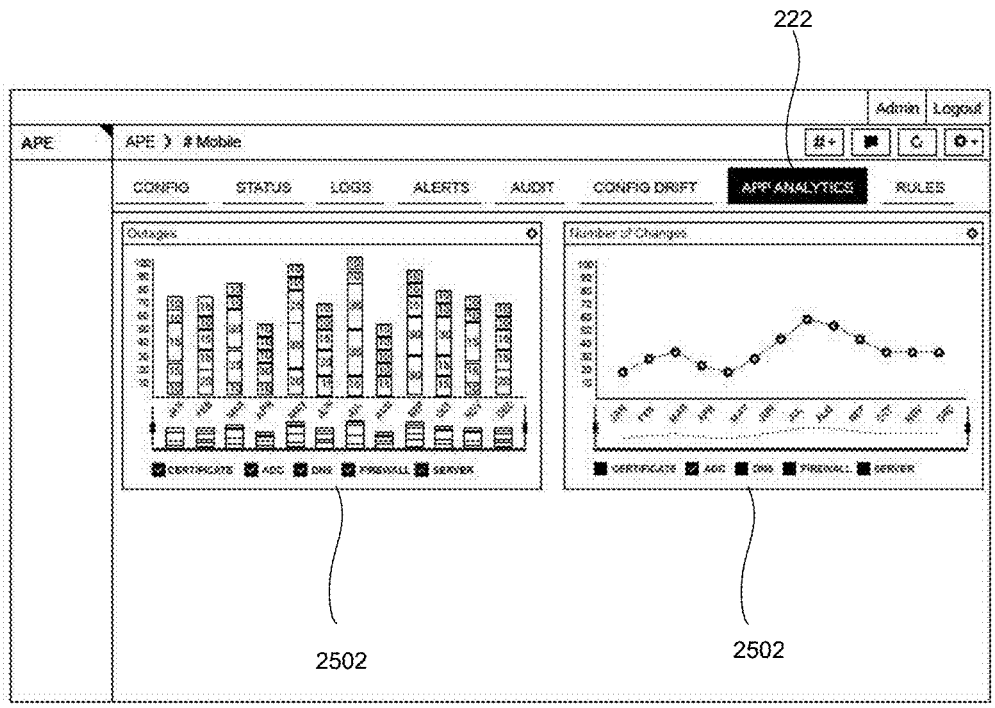
FIG. 25 illustrates a user interface view of an application analytics module of the application management system of FIG. 1 according to an embodiment herein.

FIG. 25 illustrates a user interface view of an application analytics module 222 of the application management system 106 of FIG. 1 according to an embodiment herein. The user interface view of the application analytics module 222 includes a trend graph 2502. The trend graph 2502 provides the outages and changes occurred in the one or more objects 112A1-Nn that are managed within the application ID (i.e. frequency of the system logs associated with the one or more objects 112A1-Nn, and/or frequency of configuration changes, status changes associated with the one or more objects 112A1-Nn). In one embodiment, the trend graph 2502 provides the outages based on the device category. The user interface view further provides an option to the one or more users 102A-N to create a settings (for e.g., monthly and/or weekly and/or daily) to generate the trend graph 2502.

Figure 26A:
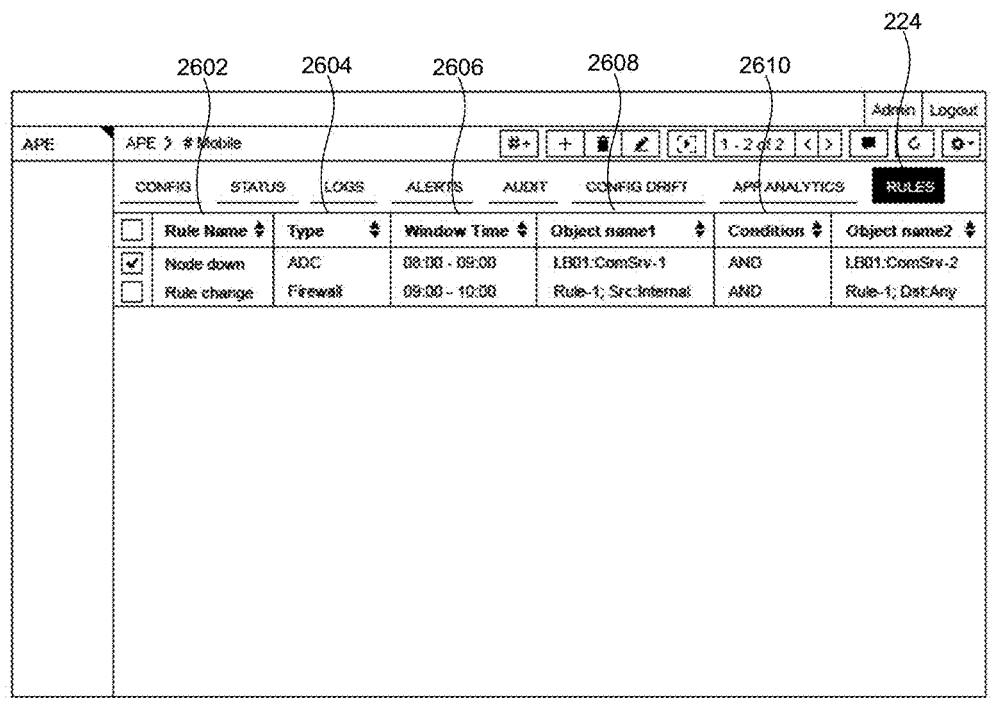
FIGS. 26A-26C illustrate user interface views of a rule module of the application management system of FIG. 1 according to an embodiment herein.
Figure 26B:
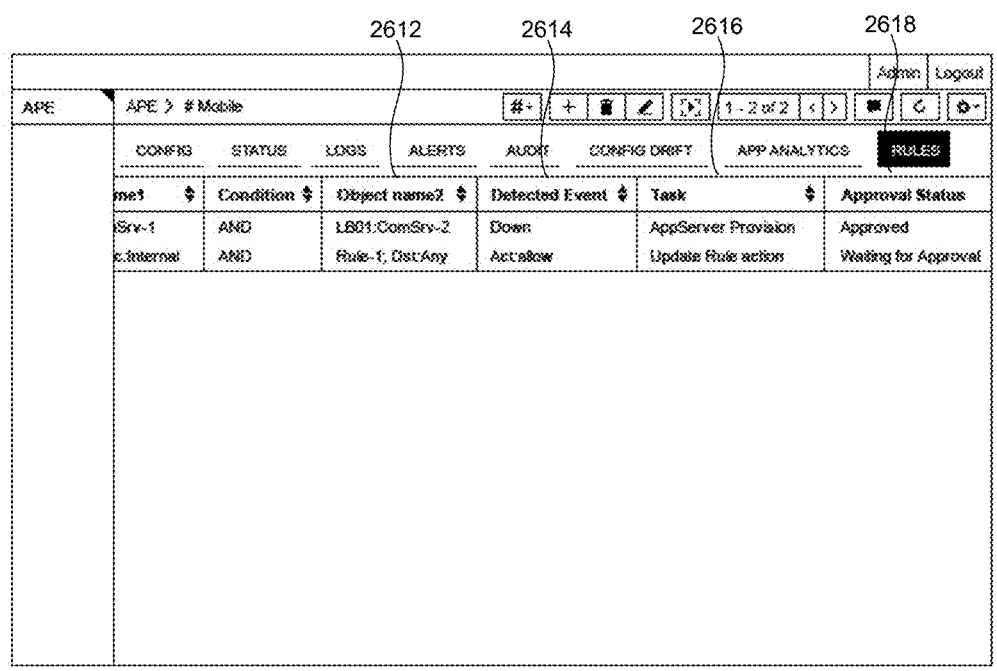
Figure 26C:
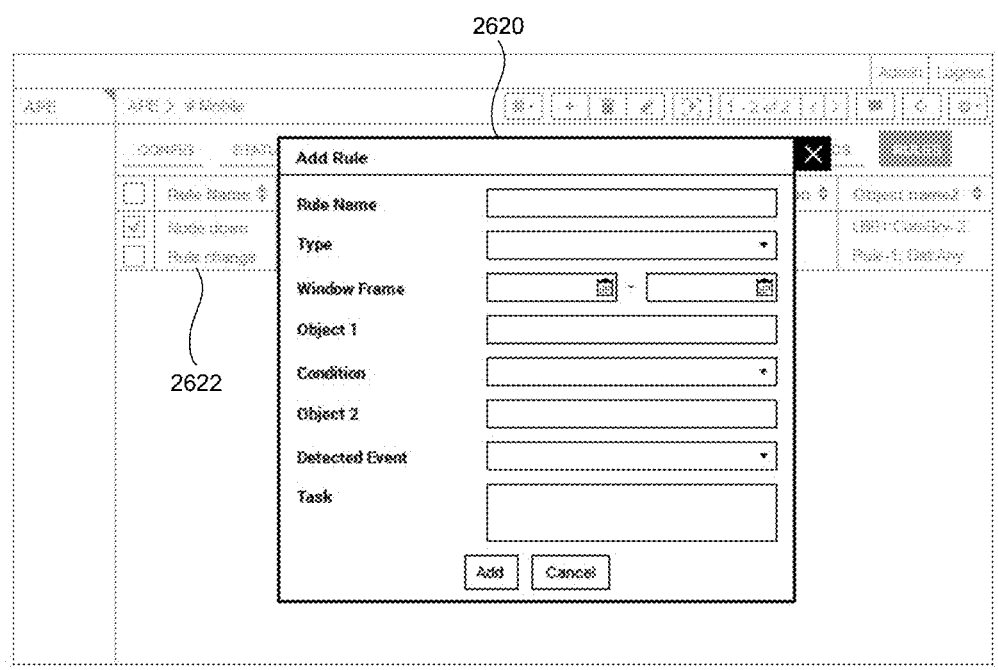

FIGS. 26A-26C illustrate user interface views of a rule module 224 of the application management system 106 of FIG. 1 according to an embodiment herein. The user interface views of the rule module 224 provide an option the one or more users 102A-N to create a new rule within the application ID. The user interface views of the rule module 224 include details of the rules as follows: (i) a rule name 2602, (ii) a type of the rule 2604, (iii) a window time of the rule 2606, (iv) a first name of an object 2608, (v) a condition of the rule 2610, (vi) a second name of the object 2612, (vii) detected event 2614, (viii) a task performed by the rule 2616, and (ix) an approval status of the rule 2618. In one embodiment, user interface views of a rule module 224 provide an option the one or more users 102A-N to enter the details in an add rule tab 2620 to create the new rule. The created rules are listed in a grid 2622. In one embodiment, an automatic work order ID is created for the rule, to proceed with a task as mentioned in the rule.

Figure 27:
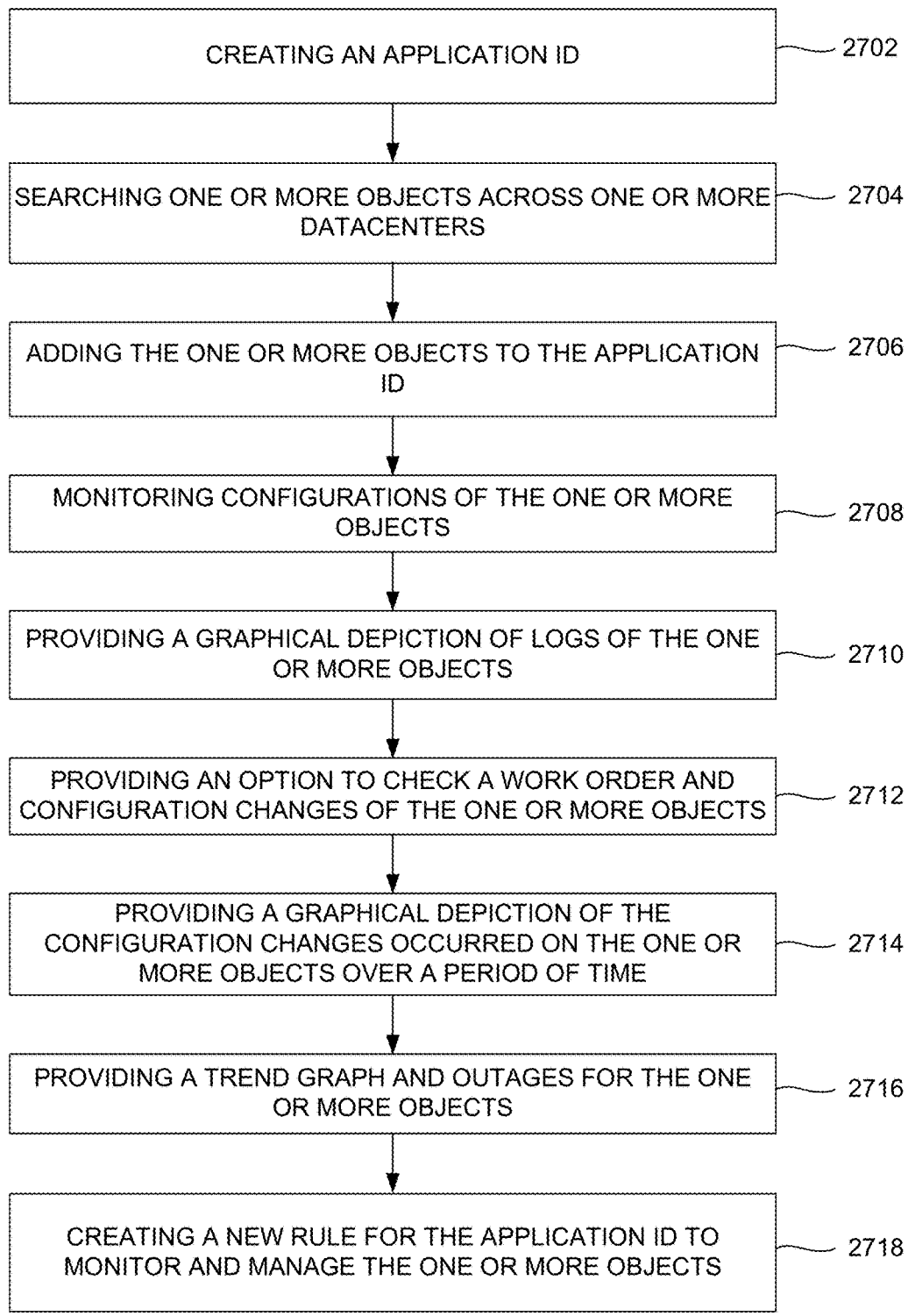
FIG. 27 is a flow diagram illustrating a computer implemented method for monitoring and managing one or more objects operating in one or more data centers on granular object level according to an embodiment herein.

FIG. 27 is a flow diagram illustrating a computer implemented method for monitoring and managing one or more objects operating in one or more data centers on granular object level using the application management system 106 according to an embodiment herein. In step 2702, the tag module 204 is configured to create a new application ID with description. In step 2704, the option module 206 provides an option to search the one or more objects 112A1-Nn in the one or more data centers 110A-N. The one or more user's 102A-N may search for the one or more objects 112A1-Nn by entering keywords in a search tab. In step 2706, the add module 205 is configured to add the one or more objects 112A1-Nn to the application ID (e.g., AppView ID). In step 2708, the configuration module 210 is configured to monitor configurations of the one or more objects 112A1-Nn that are tagged to the application ID. In step 2710, the log module 214 is configured to provide a graphical depiction of logs of the one or more objects 112A1-Nn based on severity. In one embodiment, the log module 214 is configured to provide log details of the one or more objects 112A1-Nn that are managed within the application ID. In step 2712, the audit module 218 is configured to check a work order and configuration changes of the one or more objects 112A1-Nn. The audit module 218 is further configured to provide a work order and configuration changes occurred on the one or more objects 112A1-Nn over a period of time. In step 2714, the configuration drift module 220 is configured to provide a graphical depiction of configuration changes occurred on the one or more objects 112A1-Nn over a period of time. In step 2716, the application analytics module 222 is configured to provide a trend graph for the one or more objects 112A1-Nn. The trend graph provides the outages and changes occurred in the one or more objects 112A1-Nn that are managed within the application ID (i.e. frequency of the system logs associated with the one or more objects 112A1-Nn, and/or frequency of configuration changes, status changes associated with the one or more objects 112A1-Nn). In one embodiment, the trend graph provides the outages based on the device/object category. In step 2718, the rule module 224 is configured to create a new rule for the application ID to monitor and manage the one or more objects 112A1-Nn on granular object level. In one embodiment, the rule module 224 provides a list of trigger rules in a grid view. In another embodiment, the rule module 224 is configured to automatic create a work order ID for the new rule to proceed with a task as mentioned in the new rule.

In one embodiment, the method further includes the following steps: (i) providing, using the status module 212, a status of the one or more objects 112A1-Nn; (ii) providing, using the alert module 216, an alert associated with specification details of the one or more objects 112A1-Nn; (iii) providing, using the note module, an option to add a note to the one or more objects 112A1-Nn; and (iv) providing, using the chat module, an option to chat with (a) an administrator, or (b) the one or more user's 102A-N regarding the one or more objects 112A1-Nn.

In another embodiment, the method further includes the following steps: (i) searching an existing application ID based on a keyword; (ii) restoring a previous settings in the application ID; (iii) grouping the one or more objects 112A1-Nn with the application ID; (iv) un-grouping the one or more objects 112A1-Nn from the application ID; and (v) un-tagging a group from the application ID.

In yet another embodiment, the one or more objects 112A1-Nn includes at least one of (i) an Application delivery controller (ADC) device, (ii) an object of the ADC device, (iii) a firewall device, (iv) a rule/policy of the firewall device, (v) a certificate, (vi) a domain name system (DNS) record, (vii) a network router, (viii) a network switch, and (ix) a server.

In yet another embodiment, the method further includes the following steps: (i) providing, using the ADC configuration module, configuration details of the ADC device; (ii) providing, using the secure shell (SSH) module, a SSH connectivity details of the ADC device; (iii) providing, using the physical layout module, a physical layout of the ADC device; and (iv) providing, using the ADC tagging module, tag details of the ADC device with existing application ID's.

Figure 28:
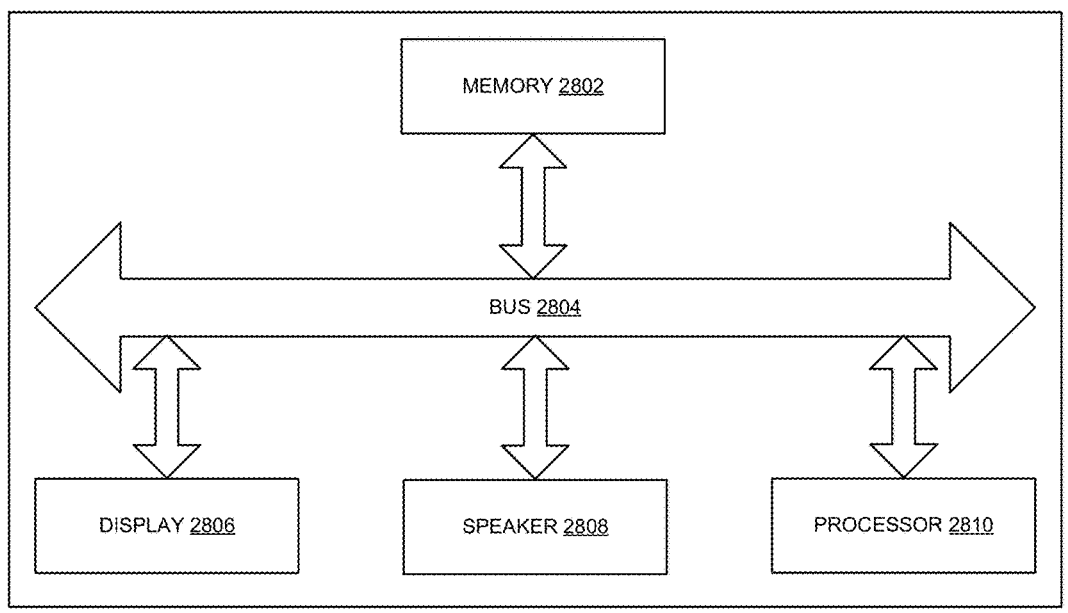
FIG. 28 illustrates an exploded view of a receiver of FIG. 1 according to an embodiment herein.

FIG. 28 illustrates an exploded view of a receiver 2800 of FIG. 1 having a memory 2802 having a set of instructions, a bus 2804, a display 2806, a speaker 2808, and a processor 2810 capable of processing the set of instructions to perform any one or more of the methodologies herein, according to an embodiment herein. The processor 2810 may also enable digital content to be consumed in the form of video for output via one or more displays 2806 or audio for output via speaker and/or earphones 2808. The processor 2810 may also carry out the methods described herein and in accordance with the embodiments herein.

Digital content may also be stored in the memory 2802 for future processing or consumption. The memory 2802 may also store program specific information and/or service information (PSI/SI), including information about digital content (e.g., the detected information bits) available in the future or stored from the past. A user of the receiver 2800 may view this stored information on display 2806 and select an item of for viewing, listening, or other uses via input, which may take the form of keypad, scroll, or other input device(s) or combinations thereof. When digital content is selected, the processor 2810 may pass information. The content and PSI/SI may be passed among functions within the receiver using the bus 2804.

The techniques provided by the embodiments herein may be implemented on an integrated circuit chip (not shown). The chip design is created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly.

The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The embodiments herein can take the form of, an entirely hardware embodiment, an entirely software embodiment or an embodiment including both hardware and software elements. The embodiments that are implemented in software include but are not limited to, firmware, resident software, microcode, etc. Furthermore, the embodiments herein can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solID state memory, magnetic tape, a removable computer diskette, a random access memory (RAM), a read-only memory (ROM), a rigID magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, remote controls, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 29:
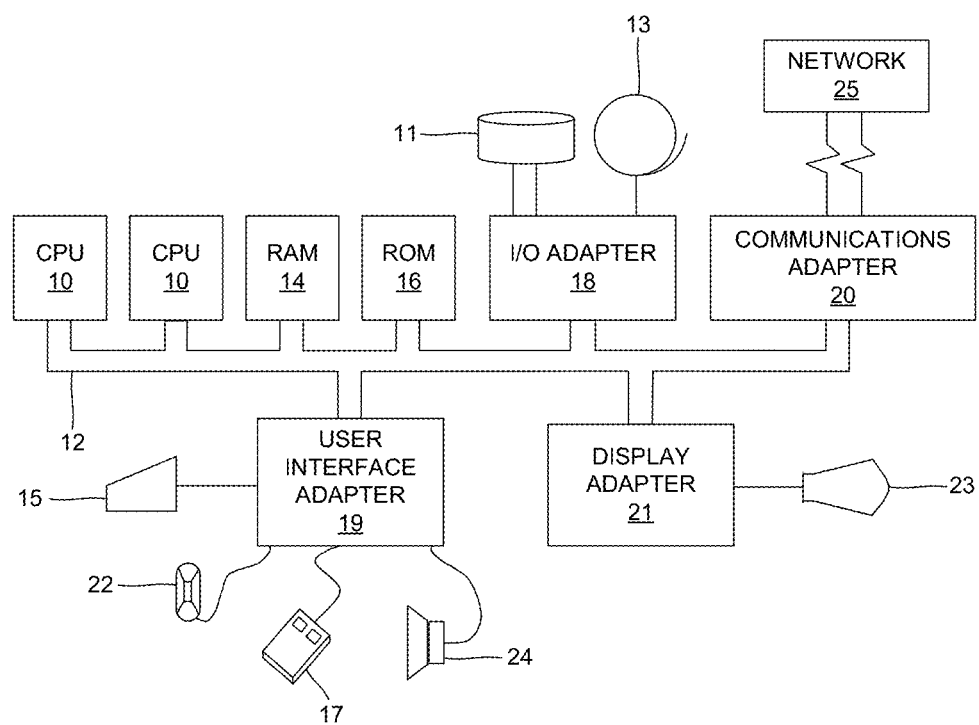
FIG. 29 illustrates a schematic diagram of a hardware configuration of information handling/computer architecture according to an embodiment herein.

FIG. 29 is a schematic drawing illustrates a hardware configuration of information handling/computer architecture in accordance with the embodiments herein. The computer architecture includes at least one processor or central processing unit (CPU) 10. The CPUs 10 are interconnected via system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of the embodiments herein.

The system further includes a user interface adapter 19 that connects a keyboard 15, mouse 17, speaker 24, microphone 22, and/or other user interface devices such as a touch screen device (not shown) or a remote control to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

The application management system 106 easing down the efforts spent by network professionals in monitoring and managing the one or more objects 112A1-Nn by grouping the one or more objects 112A1-Nn via tagging to an application ID. The application management system 106 provides an end-to-end visibility of the one or more objects 112A1-Nn managed within the application ID. The application management system 106 allows the one or more user's 102A-N to view the current status of the one or more objects 112A1-Nn that are managed within an application ID. The application management system 106 allows the one or more user's 102A-N to back up and restore/roll back the one or more objects 112A1-Nn. The application management system 106 allows the one or more user's 102A-N to chat with an administrator, and the other users who has access to the application ID. The application management system 106 allows the one or more user's 102A-N to add notes to the one or more objects 112A1-Nn for future reference.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. An application management system for monitoring and managing a plurality of objects on granular object level in a plurality of datacenters by defining and implementing a rule, said system comprising:
    a memory that stores a database; and
    a processor that is configured to
        create an application ID with description;
        search said plurality of objects across said plurality of datacenters;
        add or tag said plurality of objects to said application ID;
        manage said plurality of objects that are tagged to said application ID on granular object level, wherein said plurality of objects is managed by
            defining a rule for said application ID to monitor and manage said plurality of objects on granular object level; and
            automatically implementing said rule to create a work order to perform a task as defined in said rule, wherein said task as defined in said rule comprises at least one of
                automatically monitoring (i) configurations of said plurality of objects and (ii) a traffic overload between said plurality of objects that are associated with said application ID;
                automatically generating a first graphical depiction of logs of said plurality of objects based on severity of said logs of said plurality of objects that are tagged to said application ID;
                automatically determining configuration changes of said plurality of objects that are tagged to said application ID based on said work order for generating (i) a second graphical depiction of said configuration changes occurred over a period of time and (ii) a summary of said configuration changes occurred on said plurality of objects when slides over said second graphical depiction; or
                automatically determining frequency of said logs associated with said plurality of objects, frequency of said configuration changes, and status changes associated with said plurality of objects for generating a trend graph for said plurality of objects; and
            enable a user to perform a plurality of actions on at least one of said first graphical depiction, said second graphical depiction or said trend graph to manage said plurality of objects on granular object level, wherein said plurality of actions comprises:
                navigating to a selected certificate from a list of certificates for (i) un-tagging said selected certificate from a certificate category or said application ID, (ii) ungrouping said selected certificate from said certificate category or said application ID and (iii) grouping said selected certificate with the selected certificate category or said application ID to manage said selected certificate; and
                comparing configurations of a plurality of objects of a firewall device and viewing configurations of each of said plurality of objects to manage at least one of (a) said firewall device, or (b) rules/policies of said firewall device.

2. The application management system of claim 1, wherein said plurality of objects comprises at least one of (i) an Application delivery controller (ADC) device, (ii) an object of said ADC device, (iii) a firewall device, (iv) a rule/policy of said firewall device, (v) a certificate, (vi) a domain name system (DNS) record, (vii) a network router, (viii) a network switch, or (ix) a server.

3. The application management system of claim 1, wherein said processor is configured to
    group said plurality of objects to said application ID;
    un-group said plurality of objects from said application ID; and
    remove said plurality of objects from said application ID.

4. The application management system of claim 1, wherein said processor is configured to
    search an existing application ID across said plurality of datacenters based on a keyword; and
    provide a status of said plurality of objects; and
    provide an alert associated with specification details of said plurality of objects.

5. The application management system of claim 1, wherein said plurality of actions comprises:
    restoring previous configurations of said plurality of objects; restoring a previous setting in said application ID; adding a note to said plurality of objects; and
    enabling a chat with (i) an administrator, or (ii) a plurality of users regarding said plurality of objects.

6. The application management system of claim 1, wherein said plurality of actions comprises:
    viewing at least one of (a) configuration of a selected object of an ADC device, (b) Secure Shell (SSH) details of said selected object, (c) Physical Layout of said selected object or (d) Tagging details of said selected object with said application ID to manage at least one of (a) said ADC device, or (b) said selected object of said ADC device;

viewing a plurality of records of a selected DNS device to manage at least one of (a) said DNS device, or (b) DNS records; and creating a server to manage a traffic overload between said server and said plurality of objects.

7. A computer implemented method for monitoring and managing a plurality of objects on granular object level across a plurality of datacenters by defining and implementing a rule, said method comprising:

creating an application id;

searching said plurality of objects across said plurality of datacenters;

adding or tagging said plurality of objects to said application ID;

managing said plurality of objects that are tagged to said application ID on granular object level by defining a rule for said application ID to monitor and manage said plurality of objects on granular object level; and automatically implementing said rule to create a work order to perform a task as defined in said rule, wherein said task as defined in said rule comprises at least one of automatically monitoring (i) configurations of said plurality of objects and (ii) a traffic overload between said plurality of objects that are associated with said application ID;

automatically generating a first graphical depiction of logs of said plurality of objects based on severity of said logs of said plurality of objects that are tagged to said application ID;

automatically determining configuration changes of said plurality of objects that are tagged to said application ID based on said work order for generating (i) a second graphical depiction of said configuration changes occurred on said plurality of objects over a period of time and (ii) a summary of said configuration changes occurred on said plurality of objects when slides over said second graphical depiction; or automatically determining frequency of said logs associated with said plurality of objects, frequency of said configuration changes, and status changes associated with said plurality of objects for generating a trend graph for said plurality of objects; and enabling a user to perform a plurality of actions on at least one of said first graphical depiction, said second graphical depiction or said trend graph to manage said plurality of objects on granular object level, wherein said plurality of actions comprises:

navigating to a selected certificate from a list of certificates for (i) un-tagging said selected certificate from a certificate category or said application ID, (ii) ungrouping said selected certificate from said certificate category or said application ID and (iii) grouping said selected certificate with the selected certificate category or said application ID to manage said selected certificate; and comparing configurations of a plurality of objects of a firewall device and viewing configurations of each of said plurality of objects to manage at least one of (a) said firewall device, or (b) rules/policies of said firewall device.

8. The method of claim 7, wherein said method further comprises:

providing a status of said plurality of objects;

providing an alert associated with specification details of said plurality of objects; and searching an existing application ID based on a keyword.

9. The method of claim 7, wherein said plurality of actions comprises:

restoring previous settings in said application ID;

grouping said plurality of objects with said application ID;

un-grouping said plurality of objects from said application ID;

un-tagging a group from said application ID;

adding a note to said plurality of objects; and enabling a chat with (i) an administrator, or (ii) a plurality of users regarding said plurality of objects.

10. The method of claim 7, wherein said plurality of objects comprises at least one of (i) an Application delivery controller (ADC) device, (ii) an object of said ADC device, (iii) a firewall device, (iv) a rule/policy of said firewall device, (v) a certificate, (vi) a domain name system (DNS) record, (vii) a network router, (viii) a network switch, or (ix) a server.

11. The method of claim 7, wherein said plurality of actions comprises:

viewing at least one of (a) configuration of a selected object of an ADC device, (b) Secure Shell (SSH) details of said selected object, (c) Physical Layout of said selected object or (d) Tagging details of said selected object with said application ID to manage at least one of (a) said ADC device, and (b) said selected object of said ADC device;

viewing a plurality of records of a selected DNS device to manage at least one of (a) said DNS device, or (b) DNS records; and creating a server to manage a traffic overload between said server and said plurality of objects.

12. A non-transitory program storage device readable by computer, and comprising a program of instructions executable by said computer to perform a method for monitoring and managing a plurality of objects on granular object level across a plurality of datacenters by defining and implementing a rule, said method comprising:

creating an application ID;

searching said plurality of objects across said plurality of datacenters;

adding or tagging said plurality of objects to said application ID;

managing said plurality of objects that are tagged to said application ID on granular object level by defining a rule for said application ID to monitor and manage said plurality of objects on granular object level; and automatically implementing said rule to create a work order to perform a task as defined in said rule, wherein said task as defined in said rule comprises at least one of automatically monitoring (i) configurations of said plurality of objects and (ii) a traffic overload between said plurality of objects that are associated with said application ID;

automatically generating a first graphical depiction of logs of said plurality of objects based on severity of said logs of said plurality of objects that are tagged to said application ID;

automatically determining configuration changes of said plurality of objects that are tagged to said application ID based on said work order for generating (i) a second graphical depiction of said configuration changes occurred on said plurality of objects over a period of time and (ii) summary of said configuration changes occurred on said plurality of objects when slides over said second graphical depiction; or automatically determining frequency of said logs associated with said plurality of objects, frequency of said configuration changes, and status changes associated with said plurality of objects for generating a trend graph for said plurality of objects; and enabling a user to perform a plurality of actions on at least one of said first graphical depiction, said second graphical depiction or said trend graph to manage said plurality of objects on granular object level, wherein said plurality of actions comprises:

navigating to a selected certificate from a list of certificates for (i) un-tagging said selected certificate from a certificate category or said application ID, (ii) ungrouping said selected certificate from said certificate category or said application ID and (iii) grouping said selected certificate with the selected certificate category/the application ID to manage said selected certificate; and comparing configurations of a plurality of objects of a firewall device and viewing configurations of each of said plurality of objects to manage at least one of (a) said firewall device, or (b) rules/policies of said firewall device.

13. The non-transitory program storage device of claim 12, wherein said plurality of actions comprises:

restoring previous settings in said application ID;

grouping said plurality of objects with said application ID;

un-grouping said plurality of objects from said application ID;

un-tagging a group from said application ID;

adding a note to said plurality of objects; and enabling a chat with (i) an administrator, or (ii) a plurality of users regarding said plurality of objects.

14. The non-transitory program storage device of claim 12, wherein said plurality of objects comprises at least one of (i) an Application delivery controller (ADC) device, (ii) an object of said ADC device, (iii) a firewall device, (iv) a rule/policy of said firewall device, (v) a certificate, (vi) a domain name system (DNS) record, (vii) a network router, (viii) a network switch, or (ix) a server.

15. The non-transitory program storage device of claim 12, wherein said plurality of actions comprises:

viewing at least one of (a) configuration of a selected object of an ADC device, (b) Secure Shell (SSH) details of said selected object, (c) Physical Layout of said selected object or (d) Tagging details of said selected object with said application ID to manage at least one of (a) said ADC device, or (b) said selected object of said ADC device;

viewing a plurality of records of a selected DNS device to manage at least one of (a) said DNS device, or (b) DNS records; and creating a server to manage a traffic overload between said server and said plurality of objects.

* * * * *